US007702427B1

(12) United States Patent
Sridhar et al.

(10) Patent No.: US 7,702,427 B1
(45) Date of Patent: Apr. 20, 2010

(54) AIR TRAFFIC MANAGEMENT EVALUATION TOOL

(75) Inventors: Banavar Sridhar, Los Altos, CA (US); Kapil S. Sheth, Campbell, CA (US); Gano Broto Chatterji, Sunnyvale, CA (US); Karl D. Bilimoria, San Jose, CA (US); Shon Grabbe, San Jose, CA (US); John F. Schipper, Palo Alto, CA (US)

(73) Assignee: The United States of America as represented by the National Aeronautics and Space Administration (NASA), Washington, DC (US)

( * ) Notice: Subject to any disclaimer, the term of this patent is extended or adjusted under 35 U.S.C. 154(b) by 1314 days.

(21) Appl. No.: 10/914,783

(22) Filed: Jul. 30, 2004

(51) Int. Cl.
*G05D 1/08* (2006.01)
*G06G 7/70* (2006.01)
*G05D 1/06* (2006.01)

(52) U.S. Cl. ....................... 701/4; 701/3; 701/5; 701/6; 701/8; 701/14; 701/15; 701/16; 701/18

(58) Field of Classification Search ..................... 701/3, 701/120, 121, 122, 300, 301
See application file for complete search history.

(56) References Cited

U.S. PATENT DOCUMENTS

2004/0024528 A1* 2/2004 Patera et al. ................ 701/301

OTHER PUBLICATIONS

Bilimoria, et al., FACET: Future ATM Concepts Evaluation Tool, 3rd USA/Europe Air Traffic Management R & D Seminar, Jun. 13-16, 2000, 1-10, Napoli, Italy.

Bilimoria, A Geometric Optimization Approach to Aircraft Conflict Resolution, AIAA Guidance, Navigation and Control Conference and Exhibits, Aug. 14-17, 2000, 1-11, Denver, Colorado.

Bilimoria, et al, Performance Evaluation of Airborne Separation Assurance for Free Flight, AIAA Guidance, Navigation, and Control Conference and Exhibits, Aug. 14-17, 2000, 1-9, Denver, Colorado.

Bilimoria, et al., FACET: Future ATM Concepts Evaluation Tool, Air Traffic Control Quarterly, 2001, 1-20, 9-1.

Chatterji, et al., En-route Trajectory Prediction for Conflict Avoidance and Traffic Management, AIAA, Guidance, Navigation and Control Conference, Jul. 29-31, 1996, San Diego California, AIAA, Inc.

(Continued)

*Primary Examiner*—Khoi Tran
*Assistant Examiner*—Bhavesh V Amin
(74) *Attorney, Agent, or Firm*—John F. Schipper; Robert M. Padilla

(57) ABSTRACT

Method and system for evaluating and implementing air traffic management tools and approaches for managing and avoiding an air traffic incident before the incident occurs. The invention provides flight plan routing and direct routing or wind optimal routing, using great circle navigation and spherical Earth geometry. The invention provides for aircraft dynamics effects, such as wind effects at each altitude, altitude changes, airspeed changes and aircraft turns to provide predictions of aircraft trajectory (and, optionally, aircraft fuel use). A second system provides several aviation applications using the first system. These applications include conflict detection and resolution, miles-in trail or minutes-in-trail aircraft separation, flight arrival management, flight re-routing, weather prediction and analysis and interpolation of weather variables based upon sparse measurements.

12 Claims, 12 Drawing Sheets

OTHER PUBLICATIONS

Erzberger, et al., Direct-To Tool for En Route Controllers, IEEE Workshop on Advance Technologies and Their Impact on Air Traffic Management in the 21st Century, Sep. 26-30, 1999, 1-14, Capri, Italy.

Sridhar, et al Airspace Complexity and its Application in Air Traffic Management, 2nd USA/Europe Air Traffic Management R & D Seminar, Dec. 1-4, 1998, Orlando, Florida.

Sridhar, et al., Benefits of Direct-To Tool in National Airspace System, AIAA Guidance Navigation, and Control conference and Exhibits, Aug. 14-17, 2000, Denver Colorado, AIAA.

Sridhar, et al., Benefits of Direct-to-Tool in National Airspace System, IEEE Transactions on Intelligent Transportation Systems, Dec. 2000, 190-198, 1-4, IEEE.

Sridhar, et al., Integration of Traffic Flow Management Decisions, AIAA Guidance, Navigation, and Control Conference and Exhibit, Aug. 5-8, 2002, Monterey, California, AIAA, Inc.

Sridhar, Facet-Future ATM Concepts Evaluation Tool, NASA on the Web, www.asc.nasa.gov/aatt;facet.html, Oct. 2003.

* cited by examiner

AIR TRAFFIC MANAGEMENT EVALUATION TOOL

ORIGIN OF THE INVENTION

The invention described herein was made, in part, by one or more employees of the United States Government and may be manufactured and used by or for the Government for governmental purposes without the payment of any royalties thereon or therefor.

TECHNICAL FIELD

The present invention is a method and system for evaluating and implementing selected air traffic management concepts and tools.

BACKGROUND OF THE INVENTION

In the United States, as many as 7,000 commercial and private aircraft may be in the air simultaneously at a given time and date, and the total number of commercial flights in a given 24-hour period generally exceeds 50,000. For example, in March 2001, more than 57,000 flights were reported for one 24-hour period. Further, the growth in commercial aircraft traffic has been growing at a rate of between 2 and 7 percent per annum. Faced with a doubling of commercial air traffic in a time interval of between 10 and 35 years, workers in aviation are concerned with implementing air traffic management approaches that can safely and reliably handle air traffic growth over the next several decades.

What is needed is an approach that receives proposed flight plans and associated flight route information and flight parameters for a plurality of aircraft operating in a given region (e.g., the continental United States) and provides actual flight routes and schedules, based upon expected air traffic, and that avoids or minimizes air traffic incidents, by changing one or more flight plan parameters where appropriate, for one or more of these aircraft. Preferably, the system should provide flight route information and parameters for normal flights, for direct-to flights, for emergency responses and for free flight responses to events.

SUMMARY OF THE INVENTION

These needs are met by the invention, which provides a method and system for evaluating and implementing air traffic management (ATM) tools and approaches for managing and for avoiding an air traffic incident enroute, before the incident occurs. The invention includes a first system that receives parameters for flight plan configurations (e.g., initial fuel carried, flight route, flight route segments followed, flight altitude for a given flight route segment, aircraft velocity for each flight route segment, flight route ascent rate, flight route descent route, flight departure site, flight departure time, flight arrival time, flight destination site and/or alternate fight destination site), flight plan schedule, expected weather along each flight route segment, aircraft specifics, airspace (altitude) bounds for each flight route segment, and navigational aids available. The invention provides flight plan routing, direct routing and/or wind-optimal routing, using great circle navigation using spherical Earth geometry. The invention provides for aircraft dynamics effects, such as wind effects at each altitude, altitude changes, airspeed changes and aircraft turns to provide predictions of aircraft trajectory (and, optionally, aircraft fuel use).

A second system provides several aviation applications using the first system. Several classes of potential incidents are analyzed and averted, by appropriate change enroute of one or more parameters in the flight plan configuration, as provided by a conflict detection and resolution module and/or traffic flow management modules. These applications include conflict detection and resolution, miles-in trail or minutes-in-trail aircraft separation, flight arrival management, flight re-routing, and weather prediction and analysis.

In one approach, the present flight plan configurations for each of two or more aircraft are analyzed, and the system determines if an aircraft flight conflict (distance of closest approach of two aircraft less than a threshold number, such as 3-8 nautical miles) is likely to occur during or at the end of the flight of the aircraft. If occurrence of a conflict is likely, the system remodels the flight plan configuration(s) for one or more of these aircraft, analyzes the remodeled configuration(s), and determines if a conflict is likely with the remodeled flight plan configuration(s). If the answer to the query is "no," the system accepts and optionally implements the remodeled flight plan configuration(s) for the aircraft flights being examined. If the answer to the query is "yes," the system further changes one or more parameters in the remodeled flight plan configuration(s) and again inquires if a conflict is likely to occur with the changed and remodeled flight plan configuration(s). This procedure is iterated upon until a remodeled flight plan configuration is found that avoids a conflict along the flight route. Changes to be made to avoid a conflict may be split between the two aircraft, or allocated to a single aircraft, according to a selected sharing fraction $\phi$ ($0 \leqq \phi \leqq 1$).

In another approach, the system analyzes consecutive aircraft spacing along a selected flight route segment. If the spacing for two consecutive aircraft is smaller than a threshold number, the relative velocity of one or both of the two aircraft is adjusted to maintain at least the threshold spacing.

In another approach, the system analyzes flight arrival information for a selected destination (airport) and determines if the destination will be too congested when a selected aircraft arrives there at its scheduled arrival time. If the answer to the query is "yes," departure of the selected aircraft is delayed by an appropriate time interval so that an arrival slot for the aircraft is likely to be available at the now-modified estimated time of arrival.

In another approach, the system analyzes weather information along a selected flight route to a selected destination (airport) and determines if the anticipated weather is too severe. If the weather along the selected flight route is too severe, (1) the remainder of the flight route is altered to arrive at the same destination or (2) the remainder of the flight route is altered to arrive at an alternative destination. Flight route alteration can be implemented enroute or before departure.

The system relies upon several integrated and interacting modules. In a first module, a flight route is specified, as a sequence of waypoint locations and altitudes or as a route specified in the National Playbook Routes or in the Coded Departure Routes. In a second module, flight route and air speed restrictions are imposed, as determined from a miles-in-trail or minutes-in-trail restriction ("MIT" restriction), a ground delay restriction and/or a ground stop restriction. A third module provides individual aircraft rerouting around a congested area and a fourth module to avoid a conflict with another aircraft, in which the predicted nearest distance of approach of the two aircraft is less than a selected threshold distance.

The core system can be operated in at least five modes: (1) a playback mode, in which stored data from earlier flights or runs is played back for evaluation and further analysis; (2) a trial planning mode, in which selected parameters are altered and one or more situations are re-run to evaluate the impact of these alterations; (3) a simulation mode, in which filed flight plans and modifiable initial conditions are used to predict aircraft locations and to forecast or predict traffic patterns as a function of time; (4) a live mode, using filed flight plan and tracking information collected by air traffic controllers to provide aircraft locations in real time; and (5) a batch or collective mode, to provide a consolidated view or probabilistic view of the collective effects of variations in several initial conditions, parameters and scenarios.

DESCRIPTION OF APPLICATIONS OF THE INVENTION

Figure 1:
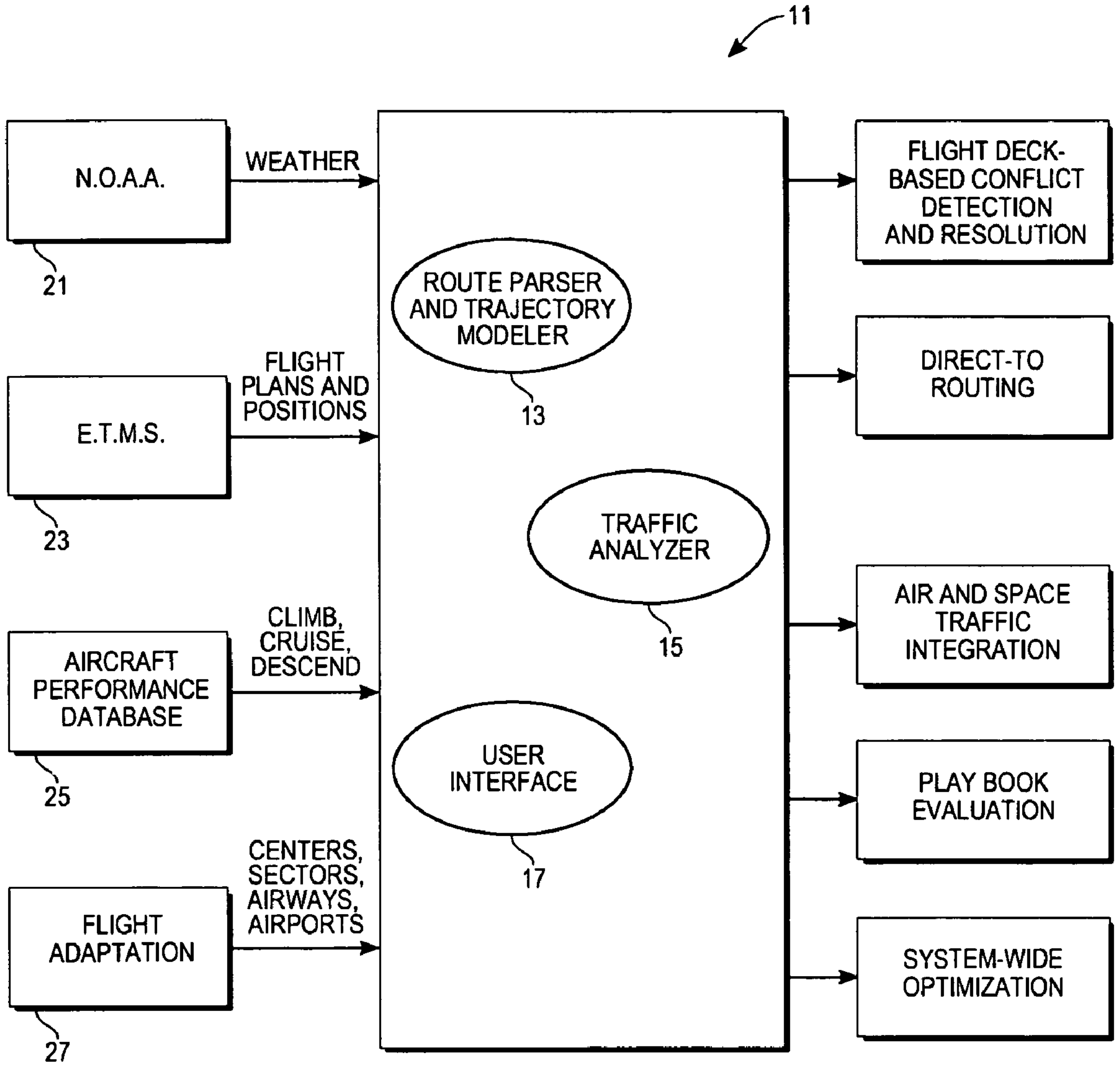
FIG. 1 illustrates architecture of a server according to the invention.

FIG. 1 illustrates the architecture of the system, emphasizing sources of the information used by the system. A geographically distributed or central server group 11 includes a route parser and trajectory modeler module 13, an air traffic analyzer module 15 and a graphical user interface (GUI) 17. The server group: receives weather information from the National Oceanics and Atmospheric Administration (N.O.A.A.) and/or from the U.S. Weather Bureau 21; receives aircraft flight path and location information from the F.A.A.'s enhanced traffic management system (ETMS) 23; receives aircraft performance data, including aircraft climb, cruise and descent information, from an aircraft performance database 25; and receives flight adaptation information on airports, airways, and traffic control centers and sectors from a flight adaptation module 27. The server group 11 analyzes the received information and provides at least six types of outputs: (i) flight deck-based conflict detection and resolution (CD&R); (ii) airport arrival and departure rules (iii) direct-to routing analysis for use in planning direct-to flights; (iv) air traffic integration information; (v) evaluation of an initial playbook route and subsequent changes that have been or will be implemented; and (vi) system-wide optimization of flight routing, flight departures and flight arrivals. The system focuses upon flights for which a flight plan has been filed (referred to as "NAS flights" herein). The system relies upon a combination of: (1) several relevant and periodically updated databases that provide information on aircraft configurations and performance data, locations and configurations of available airports and runways, special use or restricted airspaces, and present and estimated future weather data; (2) software applications that provide computations, forecasting and/or visual presentations; (3) a GUI that provides static and/or animated views of present and/or predicted air traffic, in a selected airspace region, Air Route Traffic Control Center (ARTCC), ARTCC sector and/or nationwide; and (4) an output signal stream providing recommended control advisories for traffic flow specialists.

In one embodiment, the GUI 17 provides: (1) an option of two dimensional or three dimensional displays of a particular aircraft configuration in a region; (2) separate or integrated displays of air traffic, wind components, weather and/or adaptation elements; (3) animated displays of three dimensional, weather and/or air traffic forecasts; (4) displays of filtered air traffic as presented, using traffic stream visualization to suppress display of selected classes of air traffic; and (5) fly-by animated displays, using a scroll bar to view past, present and future positions and conditions of air traffic and weather patterns.

Figure 2:
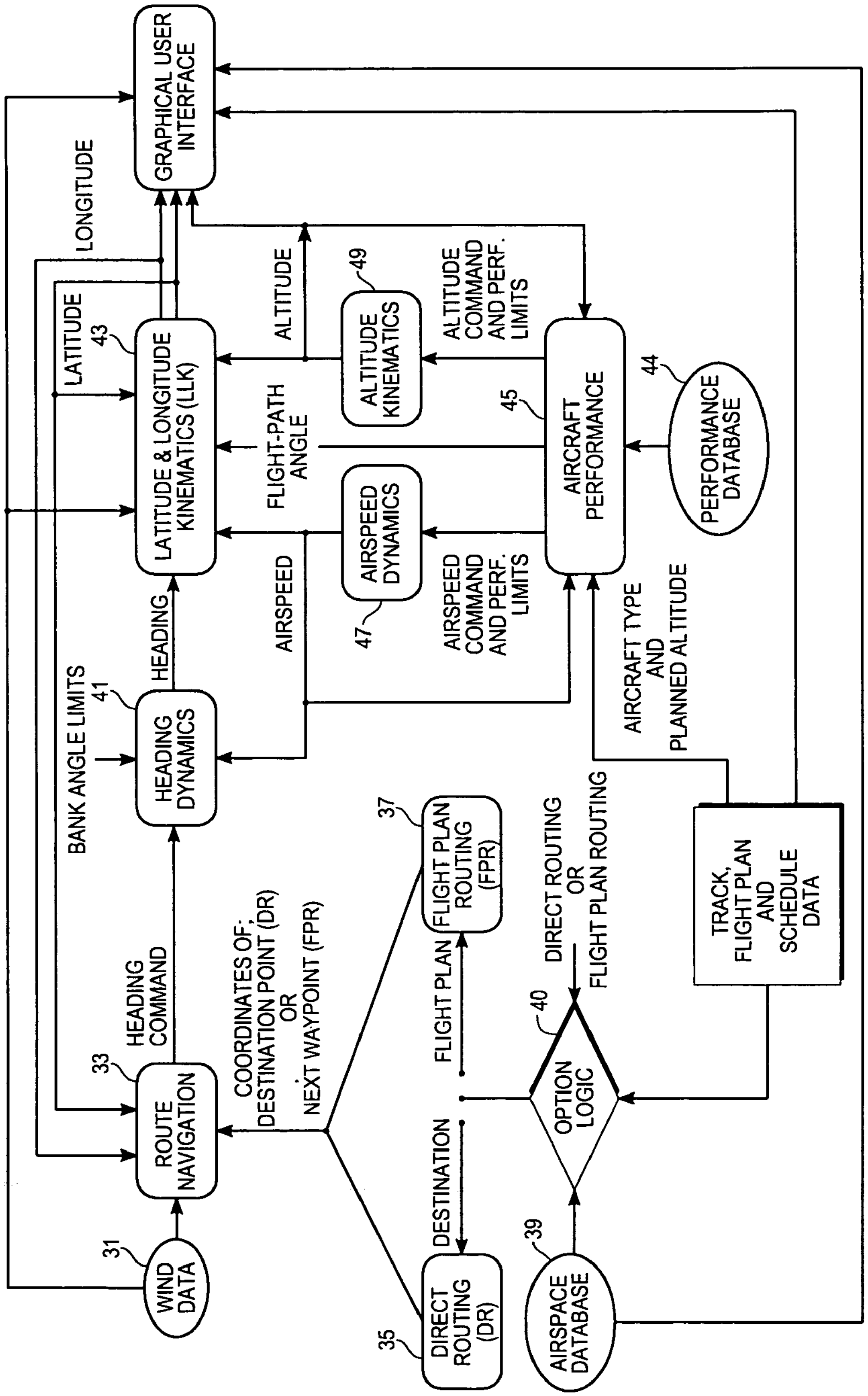
FIG. 2 illustrates components of a core architecture according to the invention.

FIG. 2 illustrates the architecture of the core components of a route parser and trajectory prediction module 13 for the system. This module provides wind data 31 and information from a route navigation module 33 to determine aircraft heading commands, which are received by a heading dynamics module 41. The heading dynamics module optionally includes information on maximum banking angle at one or more altitudes and maximum turn rate at one or more altitudes. The route navigation module 33 receives information from a direct routing module 35 or, alternatively, from a flight plan routing module 37 and provides destination coordinates. An airspace module 39 provides information to a flight option logic module 40 that determines whether the flight is simulated according to direct-to routing or according to flight plan routing. Where a flight plan is filed and followed, the flight plan routing module 37 may provide coordinates of one or waypoints for the flight route.

An aircraft performance database 44 provides relevant performance information on more than 500 aircraft, optionally including data for each aircraft on maximum airspeed in absence of wind, fuel consumption at different altitudes, different air speeds and different payload weights, maximum climb rate at one or more altitudes, aircraft weight range (empty to fully loaded), practical maximum flight altitude, and angle of attack at initiation of stall (optional). This information is provided for and used by an aircraft performance module 45 that models a selected aircraft's performance and, in turn, provides airspeed command and performance limits information for an airspeed dynamics module 47. The aircraft performance module 45 also provides altitude command and performance limits information for an altitude kinematics module 49. The airspeed dynamics module 47 provides relevant, processed airspeed and altitude information to the latitude and longitude kinematics command module 43 and to the heading dynamics module 41. The latitude and longitude (LLK) module 43 also receives relevant, processed information from the altitude kinematics module 49 and information on flight path angle. The wind data module 31, the airspace module 39, the aircraft performance module 45, the LLK module 43 provide output information that is received by the graphical user interface 17.

A. Graphical User Interface (GUI)

Figure 3:
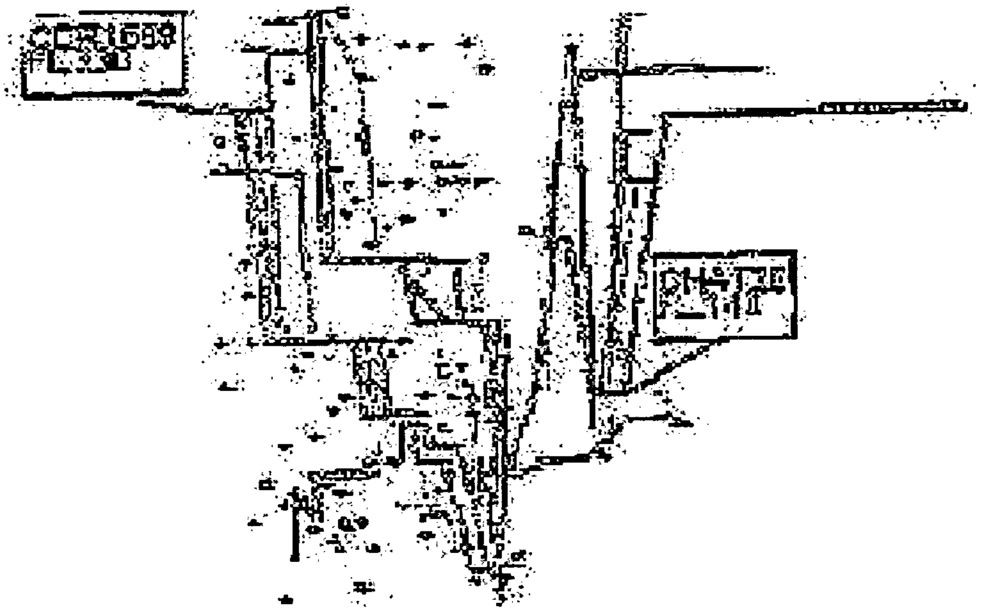
FIG. 3 illustrates a three dimensional screen display of NAS flights enroute, indicating ascent of each flight.

The GUI 17 optionally provides a three-dimensional view of one or more selected ARTCC sectors, an ARTCC itself, a geographic region, or the continental contiguous U.S. or Alaska or Hawaii, as illustrated in FIG. 3, in which the view is from the side, not the top, and an aircraft climb path or descent path is represented by an almost-vertical line in this view.

The GUI 17 can display winds-aloft patterns at selected altitudes (e.g., FL180, FL 230, FL 270, FL 310, FL 350, FL 410 and FL 450), corresponding to well-used cruise altitudes for commercial flights, for one or more selected ARTCC sectors, an ARTCC itself, a geographic region, or the continental contiguous U.S. or Alaska or Hawaii. The GUI can also display weather patterns, horizontally and vertically, which have developed or are likely to develop along a selected flight route or in a sector or an ARTCC, optionally using color coding or texture coding to display different adverse or unusual weather conditions.

The three dimensional, weather and NAS air traffic forecast visual presentations can be animated for update and display at time intervals of 1-60 minutes. The air traffic stream can be filtered so that only a relevant portion of the NAS air traffic is displayed, or is displayed in a different color or other indicium, based upon parameters such as airline (commercial flights only), aircraft manufacturer, aircraft capacity, flights within a selected heading angular sector, flights within a selected altitude band, flights having a selected source, flights having a selected destination, or flights having an estimated time of arrival (ETA) within a selected time interval at a selected destination or group of destinations. This filtering capability is useful for estimating or visualizing the airport arrival demand at a selected destination and for visualizing enroute flight segment and airport demand, within a specified time interval.

B. Provision and Evaluation of Weather and Winds Data

Assessment of weather date (including winds) at various altitudes is integrated into the system, using weather and/or wind information sources such as Collaborative Convective Forecast Product (CCFP), NOWRAD, National Convective Weather Forecast (NCWF) and Corridor Integrated Weather System (CIWS). CCFP and NCWF are national scale weather forecast products that are provided by the Aviation Weather Center. CCFP provides two-hour, four-hour and six-hour forecasts that are updated every two hours, and NCWF provides an hourly forecast. CIWS is a high resolution weather forecasting product that focuses on the northeast region of the United States and provides storm location information, echo tops and an animated two-hour forecast for growth and decay of storms. NOWRAD, developed by Weather Services International, provides high quality national and regional radar imagery. The system also allows a user to identify flights that are projected to fly through one or more specified CCFP-defined weather cells and to automatically provide a re-routing for selected flights that are adversely impacted by weather in such cells. A Rapid Update Cycle (RUC) winds module, a product of the N.O.A.A., is used in the trajectory prediction module of the system, and a wind-optimal re-routing algorithm is utilized to estimate the most fuel-efficient route(s) between a source and a destination.

Figure 4:
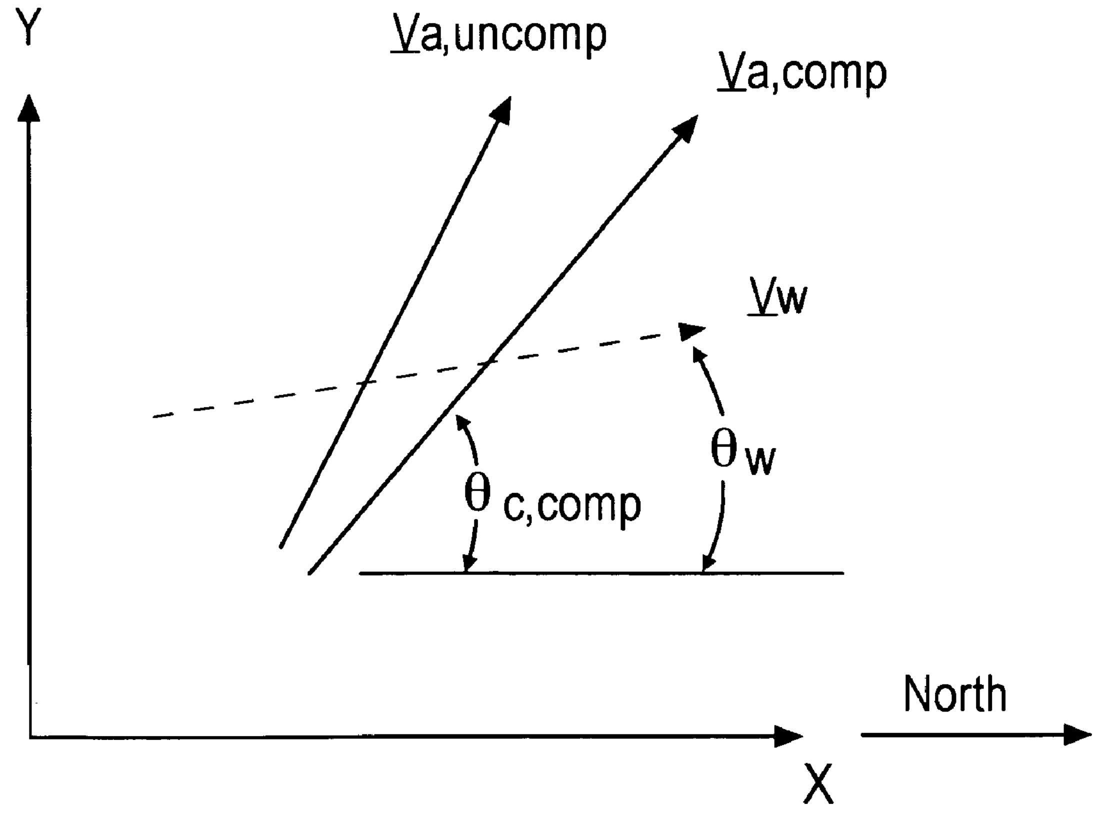
FIG. 4 illustrates effect of local wind on aircraft heading.

Optionally, the system provides optimal routing in the presence of wind and/or flight constraints. In a relatively uncomplicated embodiment, for a single leg or segment in a flight route, if the local wind at the anticipated cruise altitude has a velocity vector $v_w=(v_w \cos\theta_w, v_w \sin\theta_w)$ and the aircraft has a true air speed of $v_a$ and is to travel at an angle $\theta_{a,comp}$, relative to true north or magnetic north, after accounting for the effects of wind, the thrust of the aircraft should be oriented at a modified angle $\theta_{a,comp}$, given by $$\tan \theta hd\ a,comp=(\sin\theta_{a,comp}-\rho\sin\theta_w)/(\cos\theta_{a,comp}-\rho\cos\theta_w), \quad (1)$$

$$\rho=v_w/v_a, \quad (2)$$

as illustrated in FIG. 4. The aircraft true air speed is estimated by $$v_a=\{v_{a,comp}^2+v_w^2+2v_{a,comp}v_w\cos(\theta_{a,comp}-\theta_w)\}^{1/2}. \quad (3)$$

C. Interpolation of Wind and Weather Data

Each weather variable (including wind variables), collectively denoted W(x, y, z, t), is measured at a relatively small number of spaced apart locations and at times that are separated by one to six hours or more. An aircraft flight crew will need to estimate a value of the variable W at a location that is spaced apart from the measurement location and at a time that does not coincide with any measurement times for that variable. The system optionally provides an estimation procedure that interpolates between the measured values at the measurement locations to provide a continuously varying function value that coincides with each of the measured values at the measurement locations. Let $\{r_n\}_n$ be a sequence of spaced apart location vectors corresponding to the measurement locations, $r_n=(x_n, y_n, z_n)$ for the variable W(r,t) at the most recent time(s) the variable W was measured. Each set of four nearest neighbor location vectors $\{r_n\}_n$ defines a tetrahedron, having the location vectors as vertices, and the collective set of tetrahedrons fills all space, with overlap at boundary planes for any two contiguous tetrahedrons.

Ignore the time variable t and consider a location vector r=(x,y,z) lying in the interior or on a boundary of a selected tetrahedron Te(1, 2, 3, 4) defined by four spaced apart, non-coplanar measurement location vectors, $r_n=(x_n, y_n, z_n)$ (n=1, 2, 3, 4), at which the measurement values $W(r_n)=W(x_n, y_n, z_n)$ are known. The estimation function $$\begin{aligned} W(r;est) = & \quad (4A) \\ & W(r_1)\cdot\{|r-r_2||r-r_3||r-r_4|\}/\{|r_1-r_2||r_1-r_3||r_1-r_4|\}+ \\ & W(r_2)\cdot\{|r-r_1||r-r_3||r-r_4|\}/\{|r_2-r_1||r_2-r_3||r_2-r_4|\}+ \\ & W(r_3)\cdot\{|r-r_1||r-r_2||r-r_4|\}/\{|r_3-r_1||r_3-r_2||r_3-r_4|\}+ \\ & W(r_4)\cdot\{|r-r_1||r-r_2||r-r_3|\}/\{|r_4-r_1||r_4-r_2||r_4-r_3|\} \end{aligned}$$

is continuous within the tetrahedron Te(1, 2, 3, 4) and satisfies $W(r=r_n;est)=W(r_n)$. Because the measurement locations are spaced apart (in at least one of the three coordinates x, y and z), the denominators in Eq. (4) are never 0, and the magnitude of the function W(r;est) is bounded. The enveloping figure Te(1, 2, 3, 4) can be extended to a general polyhedron, including a line segment, a triangle, a tetrahedron and any polyhedron having two or more boundary surfaces (endpoints or vertices). More generally, if measured values $W(r_n)$ are provided at N distinct points, $r=r_n$ (n=1, . . . , N; N≧4), a suitable estimation function is $$W(r;\,est)=\sum_{m=1}^{N} W(r_m)\prod_{n=1,n\neq m}^{N}\{(r-r_n)/(r_m-r_n)\}. \tag{4B}$$

Where the location vector r lies within or on a triangle Tr(1, 2, 3) defined by three spaced apart, non-collinear measurement location vectors $r'_{n'}$ (n'=1, 2, 3) that serve as vertices for the triangle, the estimation function may be expressed as $$\begin{aligned}W'(r;\,est)=&W(r'_1)\cdot\{|r-r'_2||r-r'_3|\}/\{|r'_1-r'_2||r'_1-r'_3|\}+\\&W(r'_2)\cdot\{|r-r'_1||r-r'_3|\}/\{|r'_2-r'_1||r'_2-r'_3|\}+\\&W(r'_3)\cdot\{|r-r'_1||r-r'_2|\}/\{|r'_3-r'_1||r'_3-r'_2|\},\end{aligned} \tag{5}$$

where the interpretations are similar to those for the estimation function W(r;est) in Eq. (4).

Where the location vector r lies on a line segment Ls(1, 2) defined by two spaced apart measurement location vectors $r''_{n'}$ (n"=1, 2) that serve as endpoints for the line segment, the estimation function may be expressed as $$\begin{aligned}W''(r;\,est)=&\\&W(r''_1)\cdot\{|r-r''_2|\}/\{|r''_1-r''_2|\}+W(r''_2)\cdot\{|r-r''_1|\}/\{|r''_2-r''_1|\},\end{aligned} \tag{6}$$

where the interpretations are similar to those for the estimation functions W(r;est) and/or W'(r;est) in Eqs. (4) and (5).

More generally, one can define an estimation function W*(r;est) as a sum of two or more continuous characteristic functions W*(r;k) (k=1, . . . , K'; K'≧2), where the characteristic function W*(r;k) satisfies $$W*(r=r_p;\,k)=W(r_k)\ (p=k) \quad \text{(7A}$$

$$=0\ (P\neq k). \quad \text{(7B}$$

The function W(r;est) or the function W*(r;est) allows interpolation of a weather-wind value for any location within a polyhedron of dimension 1 or higher, defined by measurement location vectors as vertices of the polyhedron.

The values $W(r_n)$ in Eq. (4) can be replaced by time-dependent weighting functions $W(r_n;t-t_n)$ that are monotonically decreasing with the time difference, $t-t_n$, (≧0) between the present time t and the (most recent) time $t_n$ at which the measurement $W(r_n)$ was taken. An example of such weighting functions is $$\begin{aligned}W(r_n;\,t-t_n)=&\\&\beta_n\cdot W(r_n)\cdot\exp\{-\alpha_n(t-t_n)\}+(1-\beta_n)\cdot W(avg)\{1-\exp\{-\alpha_n(t-t_n)\}\}\end{aligned} \tag{8}$$

where $\alpha_n$ is a small positive first selected weighting index, $\beta_n$ is a second selected weighting index satisfying $0\leqq\beta_n\leqq1$, and W(avg) is a suitable representative value of the variable W for a location associated with the vector location r.

D. Wind Optimal Routing and Other Route Choices

A system user can choose among any of three or more routing procedures: (1) a user-preferred route between two waypoints, including but not limited to a route from origin airport to destination airport; (2) an NPR Direct route, which uses a National Playbook Route; and (3) a wind optimal route, as disclosed in U.S. Pat. No. 6,600,991, J incorporated by reference herein. In one embodiment, a "wind optimal route" is determined by (i) providing a nominal route between first and second waypoints in the presence of a first wind environment; (ii) providing values for a second wind environment that differs from the first wind environment; and (iii) using a computer to determine a neighboring optimal control solution for an aircraft moving at a selected speed between the first and second waypoints in the presence of the second wind environment. In one approach, the neighboring optimal solution provides a differential solution that determines one or more route increments that suffice to move the aircraft from the first to the second waypoint when the first wind environment is modified to become the second wind environment. The differential solution may be expressed in terms of latitude and longitude coordinates, in terms of modifications to a great circle route, or in other terms.

E. Use of Filed Flight Plans

Figure 5:
FIG. 5 illustrates a GUI screen, according to the invention, displaying NAS flights enroute within the continental contiguous U.S. at a particular time.

The system receives and stores a flight plan for each NAS flight, which includes all flights governed by instrument flight rules (IFR), for which a flight plan must be or is filed. Flights for which a flight plan is not filed are not covered by the system. The GUI 17, working in combination with other modules, provides a two-dimensional top view of NAS air traffic, with each aircraft being represented by a visually perceptible symbol, such as a cross or a generic plan view of an airplane. Optionally, different types of aircraft can be represented by visually distinguishable symbols (e.g., in different colors, different sizes or different symbols; commercial flights versus other NAS flights). The NAS air traffic can be illustrated for one or more selected sectors of an ARTCC (22 at present), an ARTCC itself, a geographic region, or the continental contiguous U.S. or Alaska or Hawaii. Each ARTCC may have each staffed by a team of air traffic controllers (ATCs). FIG. 5 illustrates a GUI screen showing approximately 4530 aircraft enroute within the contiguous states at a particular date and time (18 Mar. 2000 at 20:26 UCT). The system can provide views similar to FIG. 5 at time intervals of 1-60 minutes, or longer if desired, using aircraft location predictions determined from the flight plan.

When a flight plan is altered by the appropriate ATC, the flight plan alteration will normally be electronically posted to the ETMS and will be picked up by the system. The extant flight plan is then altered accordingly in the system flight plan database.

F. Aircraft Performance Database

Aircraft performance parameters for more than 500 representative aircraft models are provided in an aircraft performance database, currently provided by the Base of Aircraft Data (BADA), developed and maintained by the Euro Central Experimental Center in France, which is part of the system. Table 1 illustrates the parameters available for a representative aircraft, a Boeing B757. The Table first provides calibrated air speed schedule for a standard CAS-Mach climb (290 knots calibrated air speed to Mach 0.78), for a standard cruise rate (320 knots or Mach 0.80) and for a standard descent rate (300 knots CAS or Mach 0.78). As altitude increases, the true air speed (TAS) increases faster than indicated air speed (IAS).

Table 1 also sets forth cruise data for different flight levels FL=30-420 (MSL altitudes of 3,000-42,000 feet), a corresponding optimum TAS for that FL, and fuel consumption (kgm/min) for each of three aircraft mass loading configurations, m=69,600 kgm (low mass), m=95,000 kgm (nominal or medium mass) and m=110,000 kgm (high mass). TAS increases monotonically with altitude or flight level to a certain Mach number, then decreases and subsequently levels off with further increases in altitude. Fuel consumption varies markedly with altitude, especially for a high mass configuration.

Table 1 also sets forth optimal climb or ascent rate at flight levels FL=0-420 for low, medium and high mass loading configurations. Table 1 sets forth optimal descent rates at flight levels FL=0-420, for a medium mass loading configuration. Table 1 is an example of the aircraft-performance data for more than 500 aircraft that are included in the system.

The ascent rates and descent rates set forth in Table 1 are recommended rates for all altitudes. For altitudes above the transition altitude (normally between 15,000 and 20,000 feet MSL), the ascending or descending aircraft may follow a programmed altitude rate change.

An aircraft ascending to a cruise altitude will often follow one of a set of specified programs of air speed and climb rate. The programs may include a prescription for maximum climb rate (referred to as $V_x$) and/or a prescription for maximum angle of climb (referred to as $V_y$), as well as other special purpose ascent rate prescriptions.

An aircraft making a constant rate turn will have a turn rate limited by the allowable stress, the aircraft air speed, the density altitude and other relevant variables. Turn rates are typically in a range of 1-4 degrees/sec For example, a turn rate of ω=3 degrees/sec (0.05236 radians/sec) requires 120 sec to execute a 360° turn.

G. Airports, ARTCC Sectors and Air Traffic Monitoring

The system applies NAS air traffic demand forecasting and management to provide flight planning and/or replanning, for example, through change of destination, change of cruise altitude, change of cruise speed or change of flight waypoint(s), to comply with an applicable MIT flight restriction or a flight separation requirement that is implemented. This may include restrictions based upon airspace class and/or special use airspaces. The system provides on-demand reports of number of NAS flights that are known to be within, or are predicted to be within, a specified ARTCC, an ARTCC sector, a flow constrained area (FCA) and/or a special use airspace (SUA), at a selected time or within a selected time interval, using historic, stochastic, forecast and/or deterministic models of the NAS flights. Presently, 22 ARTCCs and about 830 ARTCC sectors are defined, and a given ARTCC may have a super-high (altitude) sector overlying one or more high sectors and a high sector overlying one or more low sectors.

The system can be used to design efficient aircraft ground delays and/or ground stops at a selected airport. The available visual displays include screen displays, histograms, bar charts, tables and map displays.

Where an ARTCC sector or a special use airspace (SUA) or a flow constrained airspace (FCA) experiences increased or unusual demand, this sector or SUA and adjacent regions may be rearranged or reformatted, for example, (i) by decomposing the affected sector or SUA into two or more sub-regions, each with its own air traffic controller (ATC) or set of flight restrictions and/or (ii) by rearranging the boundaries of the region and adjacent regions to balance the load on the ATC assigned to each of the regions. The system allows manual, visual modification of ARTCC sector boundaries and special use airspace boundaries and integrated display of air traffic within these modified boundaries. Modified and unmodified boundaries and air traffic can be displayed in two and three dimensions, with optional playback, simulation and live presentations. Sector, SCA and FCA demand reporting can be visualized using this option. Using any of the available system display modes (live, playback or simulation), display of NAS air traffic through the sector or SUA or FCA can be manually modified, using an intuitive click-and-drag capability built into the GUI component to implement a what-if scenario that displays the results of reconfiguration of a sector or an SUA. Two dimensional and three dimensional visualizations and air traffic reporting are available for the (changed) sector and/or SUA and/or FCA boundaries and for the resulting (re)allocation of air traffic. The predicted demand on thus-modified NAS resources can thus be modeled and analyzed, using selected air traffic flow metrics.

H. Route Parser and Trajectory Predictor

Figure 6:
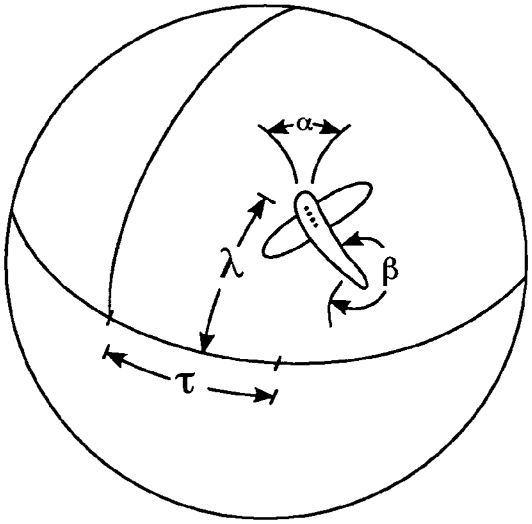
FIG. 6 illustrates geometrical and physical parameters of concern in an aircraft flight.

FIG. 6 illustrates some geometric and physical parameters for an aircraft in flight. The aircraft has a present location vector $$r=(r\cdot\cos\lambda\cdot\cos\tau, r\cdot\cos\lambda\cdot\sin\tau, r\cdot\sin\lambda) \quad (9)$$

and moves with a present velocity vector (ignoring wind effects)

$$v=(v\cdot\cos\alpha\cdot\cos\beta, v\cdot\cos\alpha\cdot\sin\beta, v\cdot\sin\alpha), \quad (10)$$

where r and v are the aircraft radius vector and velocity vector, measured relative to the Earth's center. Here, τ and λ are longitudinal and latitudinal angles, respectively, measured from a reference position, such as the prime meridian and/or the equatorial line, and α and β are velocity vector angles.

An LLK module in the invention utilizes spherical Earth equations of motion for an aircraft, $$\partial\lambda/\partial t=\{v\cos\lambda\cdot\cos\tau+w_N\}/R, \quad (11)$$

$$\partial\tau/\partial t=\{v\cos\lambda\cdot\sin\tau+w_E\}/(R\cos\lambda), \quad (12)$$

$$\tau\approx\sin^{-1}\{(\partial h/\partial t)/v\}, \quad (13)$$

$$r(\lambda,\tau;t)=r(\text{Earth};\text{mean})+h(\lambda,\tau;t), \quad (14)$$

where $w_N$ and $w_E$ are the north-directed and east-directed components of local wind velocity, τ is longitudinal or azimuthal angle for the aircraft location, λ is latitude or polar angle for the aircraft location, and h=h(λ,τ;t) is AGL height (measured relative to local ground level, rather than relative to sea level) of the aircraft above the local terrain.

Using the system, creation of portions of air traffic scenarios can be automated, partly relieving an air traffic modeler of what would otherwise be a manually intensive procedure. Filtering and historical flight plan databases associated with the system can be used to extract historical air traffic patterns (optionally, over two or more flight days) from archived data, for flight plans that were followed and for deviated flight plans. An intuitive flight creation GUI allows flights to be added to (or deleted from) the historical air traffic patterns. The scenario creation module can be used to develop futuristic air traffic scenarios that will conserve scarce NAS resources.

Optionally, certain of the computations and the displays can be abbreviated or simplified in order to allow NAS flight modeling on a laptop computer, using a parametric trajectory prediction engine, as opposed to modeling on a more elaborate (and less portable) computer system. A simplified flight trajectory prediction model may use linear trajectory prediction or may use a more elaborate quadratic trajectory prediction, in which a great circle route is approximated, as discussed in Section K. The system architecture uses a combination of Java and C coding and can work in the Macintosh, Windows, UNIX and LINUX platforms.

I. Traffic Analyzer

The system enables demand forecasting of air and ground traffic to predict or estimate (1) number of flights in a selected sector, (2) number of flights along a selected segment of a flight route or airway, (3) airport arrival and departure rates, (4) demand for selected special use airspaces and (5) demand for flow constrained areas.

A fleet impact assessment module allows a user to determine if a selected flight in an airline's schedule will be impacted by a specified NAS constraint. The constraint may be a weather cell, an active special use air space, a congested resource (e.g., a sector, an airway, an airport or a particular runway. A special display screen optionally displays the impacted flight, relevant details of the associated flight plan and the NAS constraint. Optionally, a potential impact of the constraint on an alternative flight plan can also be demonstrated.

The system provides demand forecasting concerning the number of flights, airports, sectors, special use airspaces and flow constrained areas. Demand is predicted based on a combination of stochastic modeling, forecasting, deterministic modeling and/or actual historical counts and can be coupled with models of traffic flow management restrictions or constraints (re-routing, ground delay, ground stop, and miles-in-trail and minutes-in-trail ("MIT") restrictions. Displays of forecast variables are available as bar charts, tables and map displays.

If a landing slot is likely to be available for the selected time interval at the selected destination, the system advises that the flight can proceed as planned. If a landing slot is not likely to be available in the selected time interval at the selected destination, or if the weather along at least a portion of the planned flight route is likely to be too severe, the system advises the aircraft of the slot non-availability and/or inclement weather and optionally: (1) provides an alternate destination for the flight where a landing slot will be available during a corresponding time interval of arrival ("TIOA"); (2) advises delay of departure of the flight until a time corresponding to a time-delayed TIOA, when a landing slot will be available; (3) selects an alternative destination (for the enroute aircraft), consistent with the remaining fuel reserve for the aircraft and existing weather along the alternate route, for which a landing slot will be available at a corresponding TIOA; and/or (4) advises postponement or cancellation of the flight. The system optionally estimates the remaining fuel for the aircraft, before directing the aircraft to an alternative destination.

J. Miles-in-Trail and Minutes-in-Trail Restrictions

Figure 7:
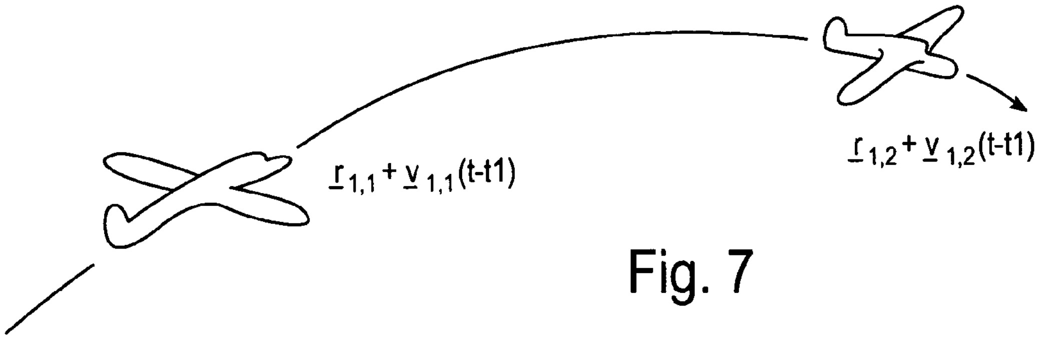
FIG. 7 illustrates two aircraft traveling along the same route segment.

FIG. 7 illustrates a spatial relationship between first and second aircraft (n=1 and n=2) traveling consecutively along the same route segment RS. The two aircraft need not have the same departure site or the same destination site. All that is required is that the two aircraft travel the same route segment for a portion of the total route of each aircraft, within a given time interval having a time interval length, such as Δt(segment)=2-7 min. According to an MIT restriction, the two consecutive aircraft are required to maintain either (1) a minimum distance of separation d(thr)=3-50 miles along the route segment (miles-in-trail), depending upon the present locations of the two aircraft, or (2) a minimum temporal separation Δt(thr), typically 0.6-3.33 minutes (minutes-in-trail). For a given initial time t=t1, an initial location vector $r_{1,i}$ and an initial velocity vector $v_{1,i}$ is determined for each of the aircrafts, i=1, 2. A separation distance along the common route segment $$d(t)=|r_{1,1}+v_{1,1}(t-t1)-r_{1,2}-v_{1,2}(t-t1)| \tag{15}$$

is then determined, using a linear approximation, for all times {t1≦t≦t(sep)} for which both aircraft will remain on the common route segment, where the vectors $v_{1,1}$ and $v_{1,2}$ are parallel but do not necessarily have the same magnitude. The calculation of minimum separation distance, given by $$d(\min)^2=\Delta r_{1,2}{}^2\Delta v_{1,2}{}^2-(\Delta r_{1,2}\cdot\Delta v_{1,2})^2\}/(\Delta v_{1,2})^2, \tag{16}$$

and the calculation of time of minimum separation distance $$t(\min)-t1=-(\Delta r_{1,2}\cdot\Delta v_{1,2})/(\Delta v_{1,2})^2, \tag{17}$$

are analogous to those for the FIG. 2 configuration but is more straightforward because $v_{1,1}$ and $v_{1,2}$ are parallel in this situation. If d(min)≦d(thr) and 0≦t−t1≦t(sep)−t1, the system notifies one or both aircraft and requests that at least one of the two aircraft change at least one of the parameters of the velocity vector(s) $v_{1,i}$ (i=1, 2). If, for example, aircraft no. 1 precedes aircraft no. 2 and $v_{1,1}\cdot v_{1,2}<v_{1,2}\cdot v_{1,2}$, (1) the second aircraft can reduce its speed $|v_{1,2}|$, (2) the first aircraft can increase its speed $|v_{1,1}|$, (3) one of the two aircraft can change its flight altitude (usually, by a multiple of 2000 feet), or (4) one of the two aircraft can change its flight route, and (5) one of the two aircraft can change its flight departure time (if at least one of the two aircraft has not yet departed) so that the separation distance d(t) does not decrease to or below d(thr) during the time interval {t1≦t≦t(sep)}. The situation illustrated in FIG. 7 is a special case of the situation illustrated in FIG. 8.

An analysis incorporating the MIT restriction(s) has been presented by Grabbe et al in "Modeling and Evaluation of Miles-in Trail Restrictions in the National Air Space" (A.I.A.A. paper 2003-5628), at the A.I.A.A. Guidance, Navigation and Control Conference, 11-14 Aug. 2003, Austin, Tex., whose content is incorporated by reference herein. In one embodiment, the analysis models the spacing $d_{i,i-1}$ between consecutive aircraft (i and i−1) on a route segment as $$d_{i,i-}=v_{i-1}(t_i(\mathrm{dep})-t_{i-1}(\mathrm{dep})), \tag{18}$$

where $t_k$(dep) is the actual departure time for aircraft no. k (k=i, i−1). This assumes that the time required to reach cruise altitude is substantially the same for each of the aircrafts i and i−1 and that the true airspeeds for each of the aircrafts i and i−1 are substantially the same. Equation (18) can be modified to model aircraft separation along a great circle segment, as $$d_{i,i-1}=(r_E+h_{i-1})|\sin\omega(t-t_i)-\sin\omega(t-t_{i-1})|, \tag{19}$$

$$\omega=v_{i-1}/(r_E+h_{i-1}), \tag{20}$$

where $r_E$ is a representative radius of the Earth and $h_{i-1}$ (=$h_i$) is the cruise altitude of each aircraft. An analytical miles-in-trail (or minutes-in-trail) model works with a MIT time difference $$\Delta T_{i,i-1}=t_i(\mathrm{dep})-t_{i-1}(\mathrm{dep})=d_{i,i}/v_{i-1}, \tag{21}$$

and requires that $$\Delta T_{i,i-1}\geqq d(\mathrm{thr})/v_{i-1}, \tag{22}$$

where ΔL is the corresponding MIT minimum separation distance. This analysis can be extended from two consecutive aircraft to N consecutive aircraft (N≧2), all traveling the same route segment.

A second approach for MIT analysis uses a linear programming model and seeks to minimize a sum $$\Delta = \min\left\{\sum_{i=1}^{N(slots)} \sum_{j=1}^{N(aircraft)} n_{i,j}\{t_i(\text{slot}) - t_j(dep)\}\right., \tag{23}$$

subject to the constraints in Eqs. (22), where N(slots) and N(aircraft) are the number of aircraft loading slots and the number of aircraft, respectively, and nij is a positive weighting factor (optionally uniform). The weighting factors are subject to the following constraints:

$$\sum_{i=1}^{N(slots)} n_{i,j} = 1, \tag{24}$$

$$\sum_{j=1}^{N(aircraft)} n_{i,j} = 1. \tag{25}$$

In another situation, an aircraft, either enroute or not yet departed, inquires about availability of a gate during a selected time interval, including its estimated arrival time at the aircraft's intended destination. If a landing slot is likely to be available for the selected time interval at the selected destination, the system advises that the flight can proceed as planned. If a landing slot is not likely to be available in the selected time interval at the selected destination, the system proceeds as discussed in Section I.

K. Conflict Detection and Resolution

Figure 8:
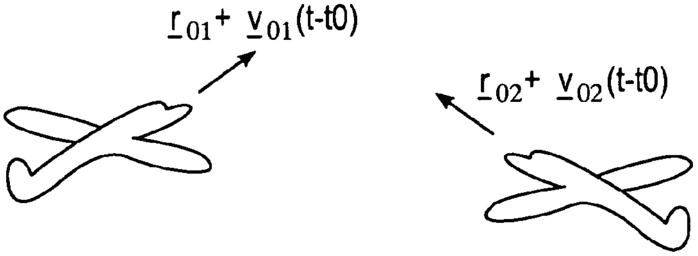
FIG. 8 illustrates two aircraft traveling in the same region.

FIG. 8 illustrates a spatial relationship between first and second aircraft (n=1 and n=2) traveling along individual routes in the same region. Beginning at an initial reference location, $r=r_{0,n}$ (n=1, 2), and an initial velocity, $v=v_{0,n}$ (n=1, 2), for each of the aircraft at the same time, t=t0, along the respective flight routes, the separation distance $$D(t)=|r_{0,1}+v_{0,1}(t-t0)-r_{0,2}-v_{0,2}(t-t0)| \tag{26}$$

is computed and minimized with respect to time to determine a projected minimum separation distance D(min) given by $$D(\min)^2=\{\Delta r_{1,2}{}^2\Delta v_{1,2}{}^2-(\Delta r_{1,2}\cdot\Delta v_{1,2})^2\}/(\Delta v_{1,2})^2, \tag{27}$$

$$\Delta r_{1,2}=(\Delta r_{0,1}\cos\tau 1\cos\lambda 1-r_{0,2}\cos\tau 2\cos\lambda 2, r_{0,1}\cos\tau 1\sin\lambda 1-r_{0,2}\cos\tau 2\sin\lambda 2, r_{0,1}\sin\tau 1-r_{0,2}\sin\tau 2), \tag{28}$$

$$\Delta v_{1,2}=(r_{0,1}\cos\alpha 1\cos\beta 1-v_{0,2}\cos\alpha 2\cos\beta 2, r_{0,1}\cos\alpha 1\sin\beta 1-v_{0,2}\cos\alpha 2\sin\beta 2, v_{0,1}\sin\alpha 1-v_{0,2}\sin\alpha 2), \tag{29}$$

The computed minimum separation time, $$t(\min)-t0=-(\Delta r_{1,2}\cdot\Delta v_{1,2})/(\Delta v_{1,2})^2, \tag{30}$$

is required to be non-negative, or the minimum separation distance is ignored.

This minimum separation distance is compared with a selected threshold separation distance D(thr) (typically 3-5 miles in horizontal separation and 1000-2000 feet in vertical separation) to determine if, based upon the projected location vectors, the two aircraft will pass too close to each other (i.e., D(min)<D(thr)). If the answer to this query is "yes," one or both of these aircraft is advised to alter one or more parameters of its present velocity vector by a selected amount in order to avoid a separation "incident," corresponding to D(min)≦D(thr). If the answer to this query is "no," the two aircraft are allowed to continue, using the present parameter values for their velocity vectors. When one or both of the aircraft changes at least one velocity vector parameter, either sua sponte or in response to a request by the system, a new value of D(min) is computed, using the now-modified values of the velocity vector parameters, and the comparison process is repeated.

A minimum separation distance D(min) can also be estimated, using a quadratic or parabolic extension model, rather than the linear extension model used in Eq. (26). A flight segment of each aircraft is assumed to lie in a plane and to approximate a great circle (GC) route, and the location of the aircraft is approximated by a quadratic function of the time variable t, $$r(t;\text{app})=|r(t=t0)|\{u1+\alpha_v(t-t0)+\alpha_a(t-t0)^2/2\}, \tag{31}$$

$$\alpha_v=\alpha_{vp}+\alpha_{vs},=u1\cdot\alpha_{vp}+u2\cdot\alpha_{vs}, \tag{32}$$

$$\alpha_a=\alpha_{ap}+\alpha a_{as},=u1\cdot\alpha_{ap}+u2\cdot\alpha_{as}, \tag{33}$$

where u1 and u2 are unit length vectors parallel to r(t=t0) and to v(t=t0) in the plane GC, respectively, and perpendicular to each other.

The great circle flight route is described by the vector equation $$r(t;\text{GC})=|r(t=t0)|\{u1\cos[\omega(t-t0)+\phi]+u2\sin\omega([(t-t0)+\phi]\} \tag{34}$$

where ω=|v(t=t0)|/|r(t=t0)| and ϕ is a phase angle defining an initial aircraft location. In the most general case, the vector coefficients $\alpha_{vp}$, $\alpha_{vs}$, $\alpha_{ap}$ and $\alpha_{as}$ are determined by minimizing an error integral ϵ(t0;T) based on the difference |r(t;app)−r(t;GC)|$^2$, given by $$\varepsilon(t0;T) = \int_{t0}^{T}|r(t=t0)|^2\{u1\{1-\cos\omega(t-t0)+\alpha_{vp}(t-t0)+\alpha_{ap}(t-t0)^2/2\}+\{u2\{-\sin\omega(t-t0)+\alpha_{vs}(t-t0)+\alpha_{as}(t-t0)^2/2\}\}^2\,dt \tag{35}$$

Taking account of the perpendicularity of the vectors u1 and u2, the minimization equations become $$\partial\varepsilon/\partial\alpha_{vp} = \int_{t0}^{T}|r(t=t0)|^2\{1-\cos[\omega(t-t0)+\phi]+2\alpha_{vp}(t-t0)+\alpha_{ap}(t-t0)^2/2\}(t-t0)\,dt=0, \tag{36A}$$

$$\partial\varepsilon/\partial\alpha_{ap} = \int_{t0}^{T}|r(t=t0)|^2\{1-\cos[\omega(t-t0)+\phi]+\alpha_{vp}(t-t0)+2\alpha_{ap}(t-t0)^2/2\}(t-t0)^2/2\,dt=0, \tag{36B}$$

$$\partial\varepsilon/\partial\alpha_{vs} = \int_{t0}^{T}|r(t=t0)|^2\{-\sin[\omega(t-t0)+\phi]+2\alpha_{vs}(t-t0)+\alpha_{as}(t-t0)^2/2\}(t-t0)\,dt=0 \tag{36C}$$

$$\partial\varepsilon/\partial\alpha_{as} = \int_{t0}^{T}|r(t=t0)|^2\{-\sin[\omega(t-t0)+\phi]+\alpha_{vs}(t-t0)+2\alpha_{as}(t-t0)^2/2\}(t-t0)^2/2\,dt=0 \tag{36D}$$

Equations (36A)-(36D) provide two pairs of coupled equations:

$$\begin{vmatrix} A1 & B1 \\ A2 & B2 \end{vmatrix}\begin{vmatrix} \alpha_{vp} \\ \alpha_{ap} \end{vmatrix} \begin{matrix} = \\ = \end{matrix} \begin{vmatrix} C1 \\ C2 \end{vmatrix} \quad (37A)$$

$$\begin{vmatrix} A3 & B3 \\ A4 & B4 \end{vmatrix}\begin{vmatrix} \alpha_{vs} \\ \alpha_{as} \end{vmatrix} \begin{matrix} = \\ = \end{matrix} \begin{vmatrix} C3 \\ C4 \end{vmatrix}. \quad (37B)$$

$$A1=\int_{t0}^{T}|r(t=t0)|^2\{2(t-t0)^2\}\mathrm{dt},$$

$$A2=\int_{t0}^{T}|r(t=t0)|^2\{2(t-t0)^2/2\}dt,$$

$$A3=\int_{t0}^{T}|r(t=t0)|^2\{2(t-t0)^2]dt,$$

$$A4=\int_{t0}^{T}|r(t=t0)|^2\{(t-t0)^3/2\}dt,$$

$$B1=\int_{t0}^{T}|r(t=t0)|^2\{(t-t0)^3/2\}dt,$$

$$B2=\int_{t0}^{T}|r(t=t0)|^2\{(t-t0)^4\}dt,$$

$$B3=\int_{t0}^{T}|r(t=t0)|^2\{(t-t0)^3/2\}dt,$$

$$B4=\int_{t0}^{T}|r(t=t0)|^2\{(t-t0)^4\}dt,$$

$$C1=\int_{t0}^{T}|r(t=t0)|^2\{1-\cos[\omega(t-t0)+\phi]\}(t-t0)dt,$$

$$C2=\int_{t0}^{T}|r(t=t0)|^2\{1-\cos[\omega(t-t0)+\phi](t-t0)^2dt/2,$$

$$C3=\int_{t0}^{T}|r(t=t0)|^2\{-\sin[\omega(t-t0)+\phi](t-t0)dt,$$

$$C4=\int_{t0}^{T}|r(t=t0)|^2\{-\sin[\omega(t-t0)+\phi](t-t0)^2dt/2. \quad (37C)$$

The minimum separation distance D(min) for two aircraft (numbered k=1, 2), whose location vectors are approximated as in Eq. (31), is determined by solving a cubic equation in the variable t−t0, namely $$2\Delta r\cdot\Delta v+2\{\Delta v\cdot\Delta v+2\Delta r\cdot\Delta a\}(t-t0)+6\Delta v\cdot\Delta a(t-t0)^2+4\Delta a\cdot\Delta v(t-t0)^3=0, \quad (38)$$

where Δr, Δv and Δa are the vector differences for the location r, velocity v and acceleration a for the two aircraft at t=t0, determined using Eqs. (31)-(33). Several straightforward and simple methods are available for solving cubic equations, such as Eq. (38). A numerical solution ($t-t0=t_{sol}$) is inserted into an error term $$\epsilon(\min)=|\Delta r+\Delta v\cdot t_{sol}+\Delta a\cdot(t_{sol})^2|^2, \quad (39)$$

and this error term is compared with a threshold value $D(\mathrm{thr})^2$ to determine if a conflict of the two aircraft is predicted to occur. This great circle approximation can also be used for trajectory prediction.

Figure 9:
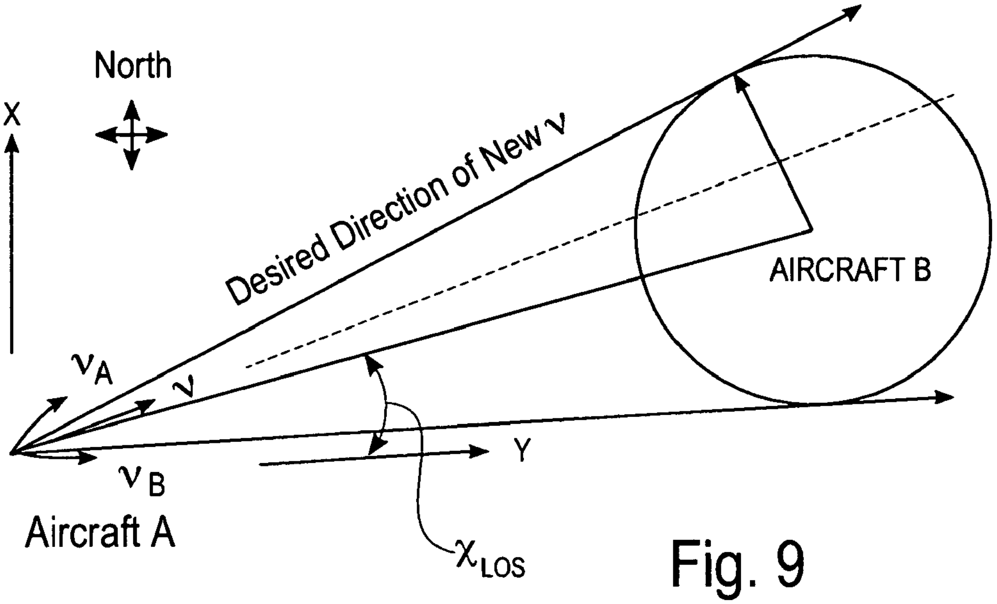
FIG. 9 illustrates a conflict situation for two aircraft.

K. D. Bilimoria, in "A Geometric Optimization Approach to Aircraft Conflict Resolution" (A.I.A.A. Paper 2000-4265), A.I.A.A. Guidance, Navigation and Control Conference, 14-17 Aug. 2000, Denver, Colo., sets forth an optimized method for resolution of an aircraft "conflict," defined as a situation in which two aircraft moving in a common (horizontal) plane, are projected to pass within a threshold distance D(thr) of each other. The content of this article is incorporated by reference herein. Conflict detection may use linear or nonlinear trajectory prediction. Given two aircraft, A and B, spaced apart by a distance $r_{LOS}$, and a velocity $v_{rel}$ of A relative to B, a conflict is predicted to occur if the predicted relative trajectory of A (A moving relative to B) will pass through at least one point of a sphere S(B), or circle in two dimensions, centered at B and having a radius D(thr), as illustrated in FIG. 9. This conflict condition is expressed as $$D(\min)=r_{LOS}|\sin(\chi_{LOS}-\chi_{rel})|<D(\mathrm{thr}), \quad (40)$$

$$r_{LOS}=\{(x_B-x_A)^2+(y_B-y_A)^2\}^{1/2}, \quad (41)$$

$$|v_{rel}|=\{v_A^2+v_B^2 2v_A v_B \mathrm{COS}(\chi_A-\chi_b)\}^{1/2} \quad (42)$$

$$\chi_{LOS}=\tan^{-1}\{(y_B-y_A)/(x_B-x_A)\} \quad (43)$$

$$\chi_{rel}=\tan^{-1}\{(v_A\sin\chi_A-v_B\sin\chi_B)/\{(v_A\cos\chi_A-v_B\cos\chi_B)\}; \quad (44)$$

This conflict can be avoided by (1) changing the relative heading angle $\chi_{re}$ of A relative to B to a modified value $$\chi^*_{rel}=\chi_{LOS}\pm\sin^{-1}\{D(\mathrm{thr})/r_{LOS}\}, \quad (45)$$

corresponding to the relative trajectory of A being tangent to the sphere S(B) at one or two surface points, as indicated in FIG. 9. Where a conflict is present, the relative heading change, $$\Delta\chi_{re}=\chi^*_{re}-\chi_{re}, \quad (46)$$

is a fundamental parameter, a measure of the change in at least one trajectory parameter for A and/or B to avoid the predicted conflict.

The conflict can be avoided (1) by relative heading change, (2) by change of the relative velocity vector $v_{rel}$, (3) by change of a combination of relative heading and relative velocity vector, (4) by change of altitude of one or both aircraft and/or (5) by a change in aircraft ascent rate or descent rate. Where relative heading is to be changed, aircraft A and aircraft B can be assigned fractional contributions, $f_A$ and $f_B$, with $f_A+f_B=1$, to the total relative heading change $\chi^*_{rel}$, according to a selected assignment rule. The corresponding fractional changes in relative heading become $$\chi_{rel,A}=\chi_{re}+f_A(\chi^*_{re}-\chi_{re}), \quad (47A)$$

$$\chi_{rel,B}=\chi_{re}+f_B(\chi^*_{re}-\chi_{re}). \quad (47B)$$

Where a relative heading change is to be made only for aircraft A, the corresponding new heading angle is determined to be $$\chi_A=\chi^*_{rel,A}-\sin^{-1}\{(v_B/v_A)\sin(\chi^*_{rel,A}-\omega_B)\}, \quad (48)$$

assuming that the magnitude of the argument of the inverse sine function in Eq. (47) is no greater than 1.

Where a speed change only is to be implemented, the modified air speed for aircraft A is determined by $$v^*_A=v_B\{\sin(\chi^*_{rel}-\chi_B)/\sin(\chi^*_{rel}-\chi_A)\}, \quad (49)$$

which is an implicit nonlinear relation between $v^*_A$, $v_B$, $\chi_A$ and $\chi_B$. Equation (49) has two solutions, corresponding to the two surface tangent points indicated in FIG. 9. Bilimoria also develops an optimal change involving both heading change and velocity change.

L. Direct-to Routing

Figure 10:
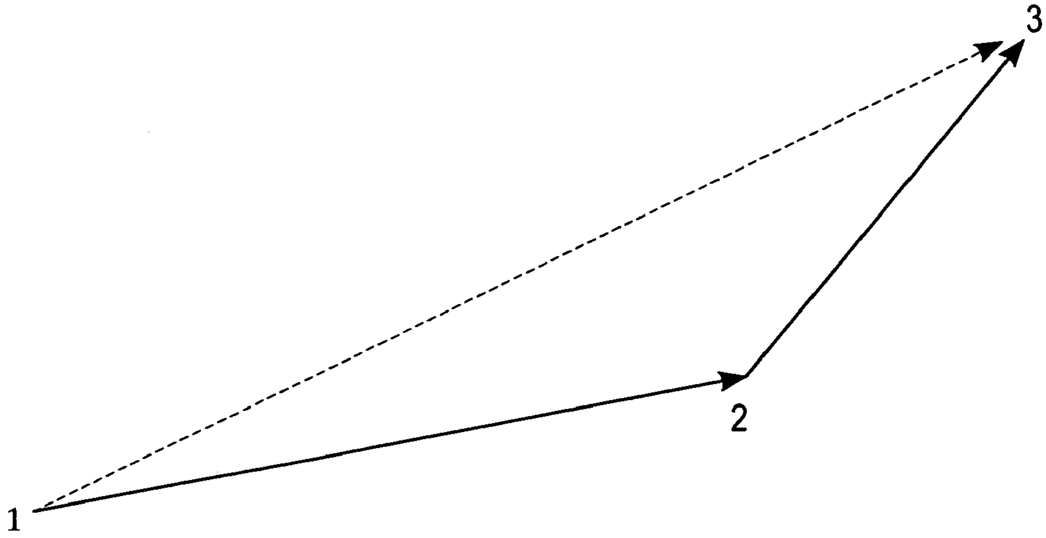
FIG. 10 illustrates direct-to routing.

Direct-to routing is incorporated as an option, to avoid use of dog leg route segments between flight route waypoints 1, 2 and 3, as illustrated in FIG. 10, when a direct flight from waypoint 1 to waypoint 3 is predicted to save at least a threshold amount of time Δt(DTR). Where direct-to routing is activated, the system estimates the time required for the aircraft to travel from waypoint 1 to waypoint 2 to waypoint 3, taking account of the local weather, applicable wind field, airspace restrictions and aircraft performance data ("flight constraints"). The system then estimates the time required to travel from waypoint 1 directly to waypoint 3 (the direct-to route), incorporating the corresponding flight constraints and compare the estimated times. If the time required to travel the conventional route segments (1 to 2 to 3) is at least a selected threshold increment Δt(DTR) (e.g., 60 sec) greater than the time required to travel the direct-to route segment (1 to 3), the conventional route segments are replaced by the direct-to route segment. Otherwise, the flight continues along the conventional route segments. For each three consecutive waypoints, this process is optionally repeated. Direct-to routing is discussed in H. Erzberger et al, Direct-To Tool for En route Controllers," Proc. IEE Workshop on Advanced Technologies and their Impact on Air Traffic Management in the 21$^{st}$ Century," Capri, Italy, 26-30 Sep. 1999 and in B. Sridhar et al, in "Benefits of Direct-To Tool in National Airspace System," I.E.E.E. Trans. on Intelligent Transportation Systems, vol. 1 (2000). The content of these references is incorporated by reference herein. The Sridhar et al article applies the Erzberger et al model to a particular CTAS site (Fort Worth ARTCC), and subsequently to all ARTCC in the NAS, reapplies a modified direst-to routing procedure that is not as complex as the CTAS model, and compares the results with the corresponding CTAS results. The two models agree closely. The modified direct-to routing procedure is part of the system disclosed here.

M. Playbook and CDR Route Evaluation Tools

Figure 11:
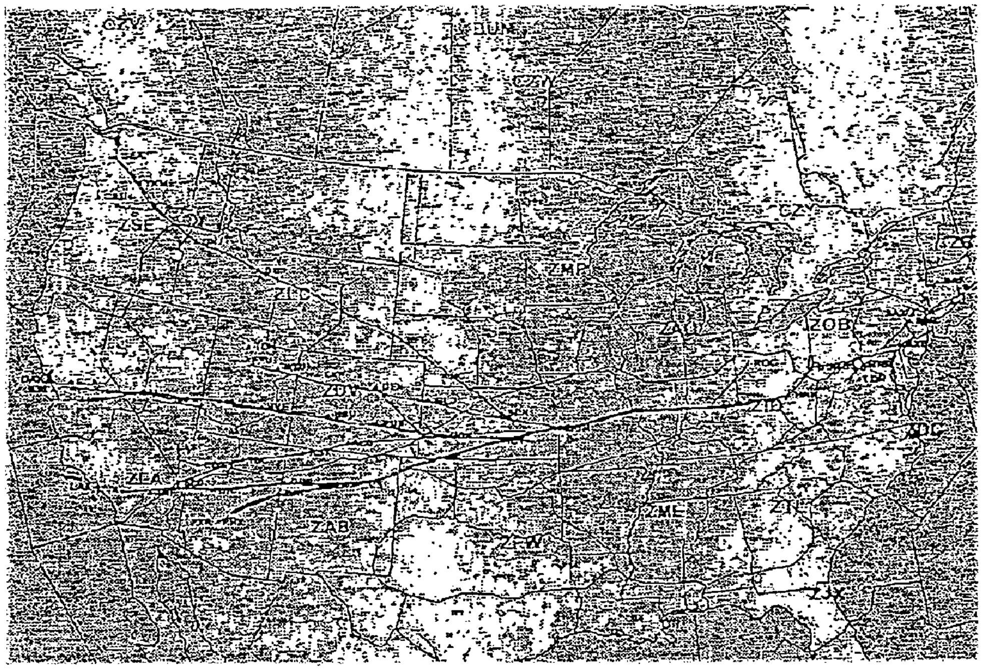
FIG. 11 is an example of a display of National Playbook Routes between major airports on the West Coast and on the East Coast.

The F.A.A. has put together, and continues to revise, a set of National Playbook Routes (NPRs), including specified waypoints, for a flight between any two of a major East Coast airport, a major Midwest airport, a major Southern airport and a major West Coast airport. FIG. 11 illustrates a sequence of waypoints between several West Coast airports (LAX, SFO, SEA, etc.) and several East Coast airports (JFK, BOS, etc.). An NPR route can be specified in a flight plan and used when severe weather does not permit a more direct flight by another route. For example, a flight from Seattle to Boston that must avoid severe weather across the North Central Plains might use an NPR route illustrated in FIG. 11.

Another series of flight routes between a source or origin airport and a destination airport is provided by the F.A.A.'s Coded Departure Routes (CDRs), provided by the Air Traffic Control System Command Center as a sequence of waypoints between the source and destination. An example of a CDR route between JFK Airport and O'Hare Airport is shown in Table 2. The CDRs may cover a larger number of airports than does the NPR system, and each ARTCC that is traversed by a CDR flight route is indicated in this Table.

The invention allows (1) addition of an aircraft on an NPR or CDR and (2) analysis and prediction of NAS-wide impact of use of such a route.

N. System-Wide Optimization

The system-wide optimization capabilities of the invention can be used to calculate an optimal combination of restrictions (i.e. miles-in-trail, minute-in-trail, reroutes, ground delay programs and ground stops), which minimize airline delays while ensuring that the capacity of scarce NAS resources, such as sectors, airports and airways, is met. To accomplish this task, detailed models of each of the aforementioned restrictions are implemented in the invention, for example, in connection with miles-in-trail (or minutes-in-trail) and rerouting capabilities of the system. The system-wide optimization capability can be used in either a "what-if" mode or a "simulation" mode to perform both real-time planning or post-operations analysis studies.

Figure 12:
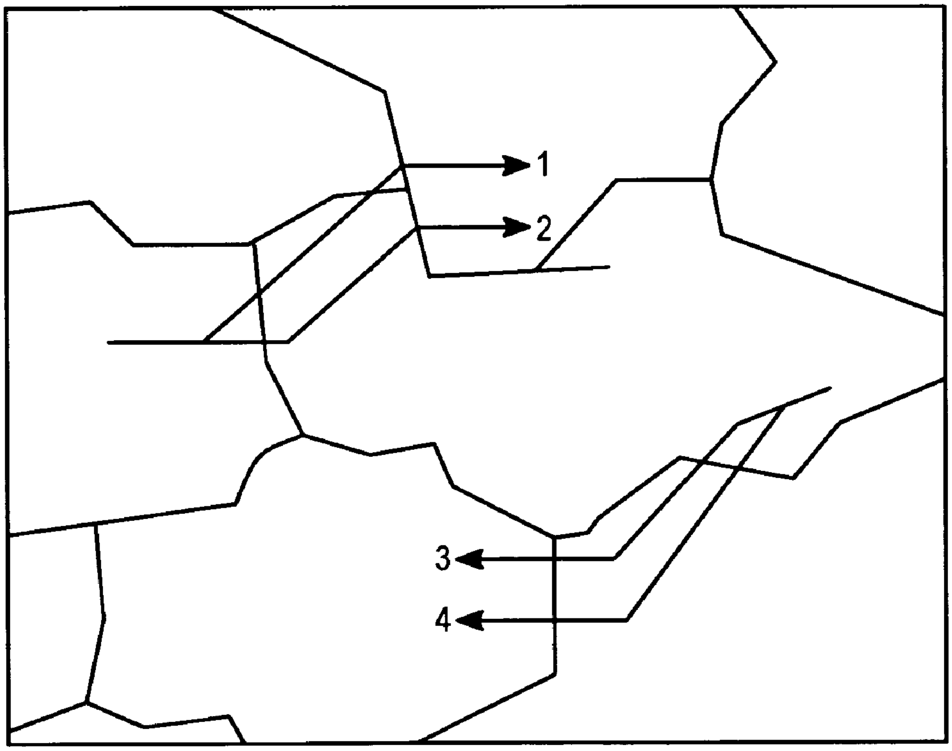
FIG. 12 illustrates rerouting of east-bound and west-bound flights around a convective weather cell.

In calculating the optimal combinations of restrictions to impose, applicable constraints are included to ensure that all solutions are equitable from the perspectives of the air carrier and the air traffic service provider. In a first example, when rerouting east-bound traffic around a convective weather cell, illustrated in FIG. 12, the invention ensures that traffic is equally distributed between the two available routes, labeled 1 and 2, to ensure that the underlying sectors are not congested. At the same time, the invention also ensures that no single airline is forced to fly predominantly along the longer and less optimal of the two available routes.

Figure 13:
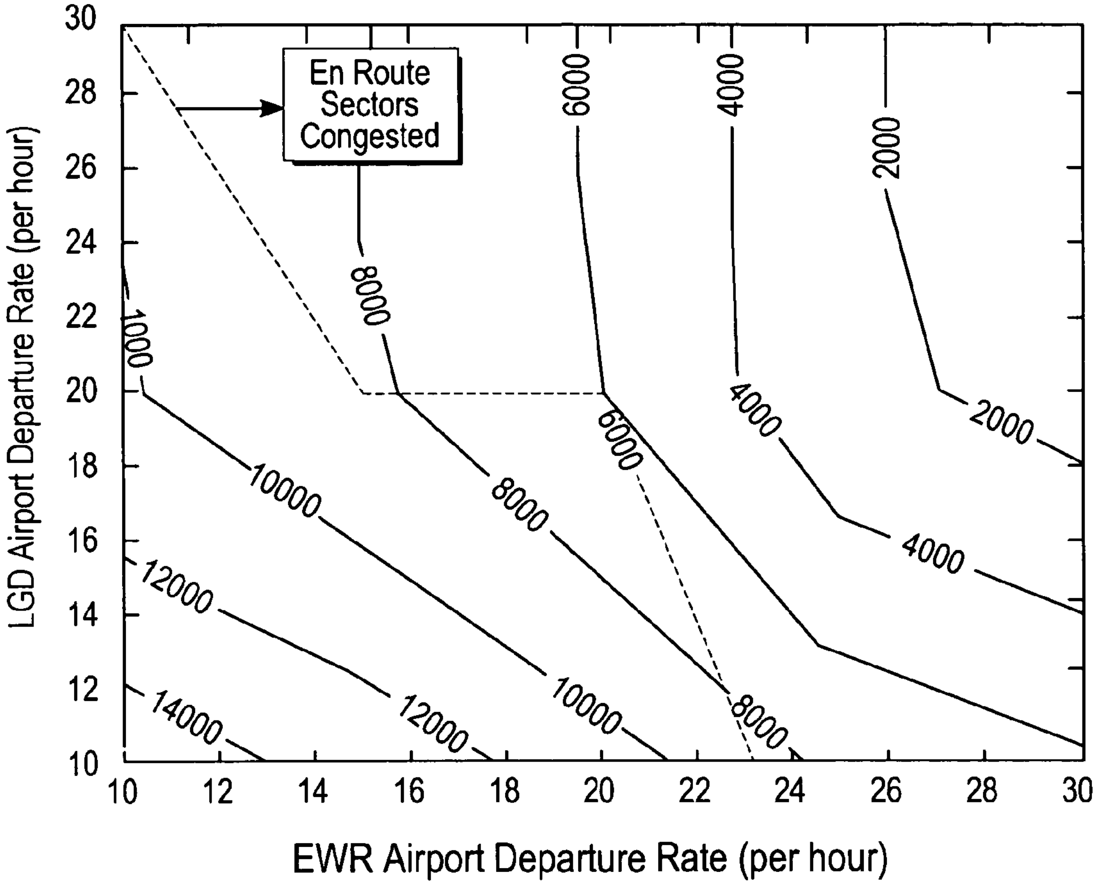
FIG. 13 graphically illustrates cumulative aircraft delay contours resulting from joint time delays in departure rates from two adjacent airports.

A second example of the system-wide optimization capabilities of the invention is illustrated in FIG. 13, where the simulation capabilities are used to calculate the NAS-wide impact of varying the departure rates from La Guardia Airport (LGA) and Newark Liberty International Airport (EWR) to other airports. Because the LGA and EWR airports are adjacent to each other, the cumulative enroute time delays for these two airports are not independent of each other. The dashed line FIG. 13 represents a boundary between those airport departure rates that lead to NAS congestion and those departure rates that do not. Based on the results presented in FIG. 13, the optimal departure rates from LGA and EWR are 20 and 21 (departures per hour), respectively. This combination of departure rates ensures that NAS-wide congestion is avoided or minimized, while limiting the cumulative airline delay to a maximum of 6000 sec. Similar results can be generated looking at any combination of restrictions that routinely impact congestion and other effects on the NAS.

O. Overall Procedure

Figure 14A:
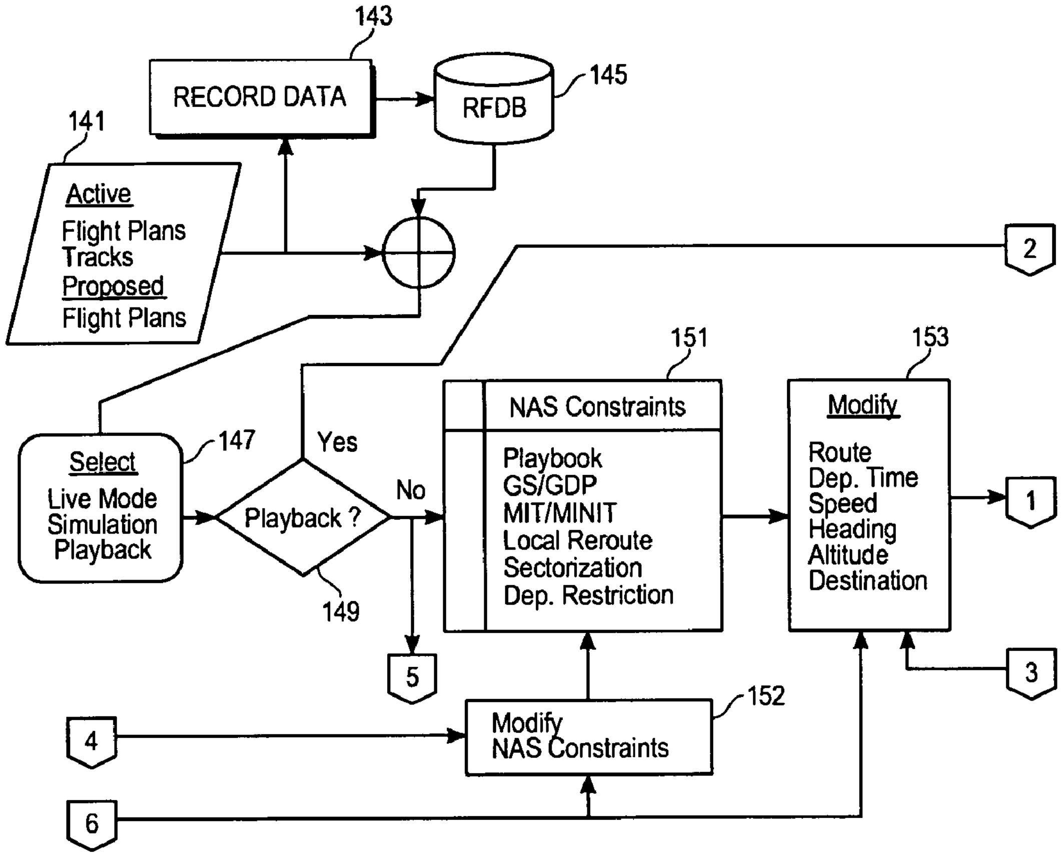
FIGS. 14*a*, 14*b*, 14*c* and 14*d* schematically illustrate an embodiment of a procedure for practicing the invention.
Figure 14B:
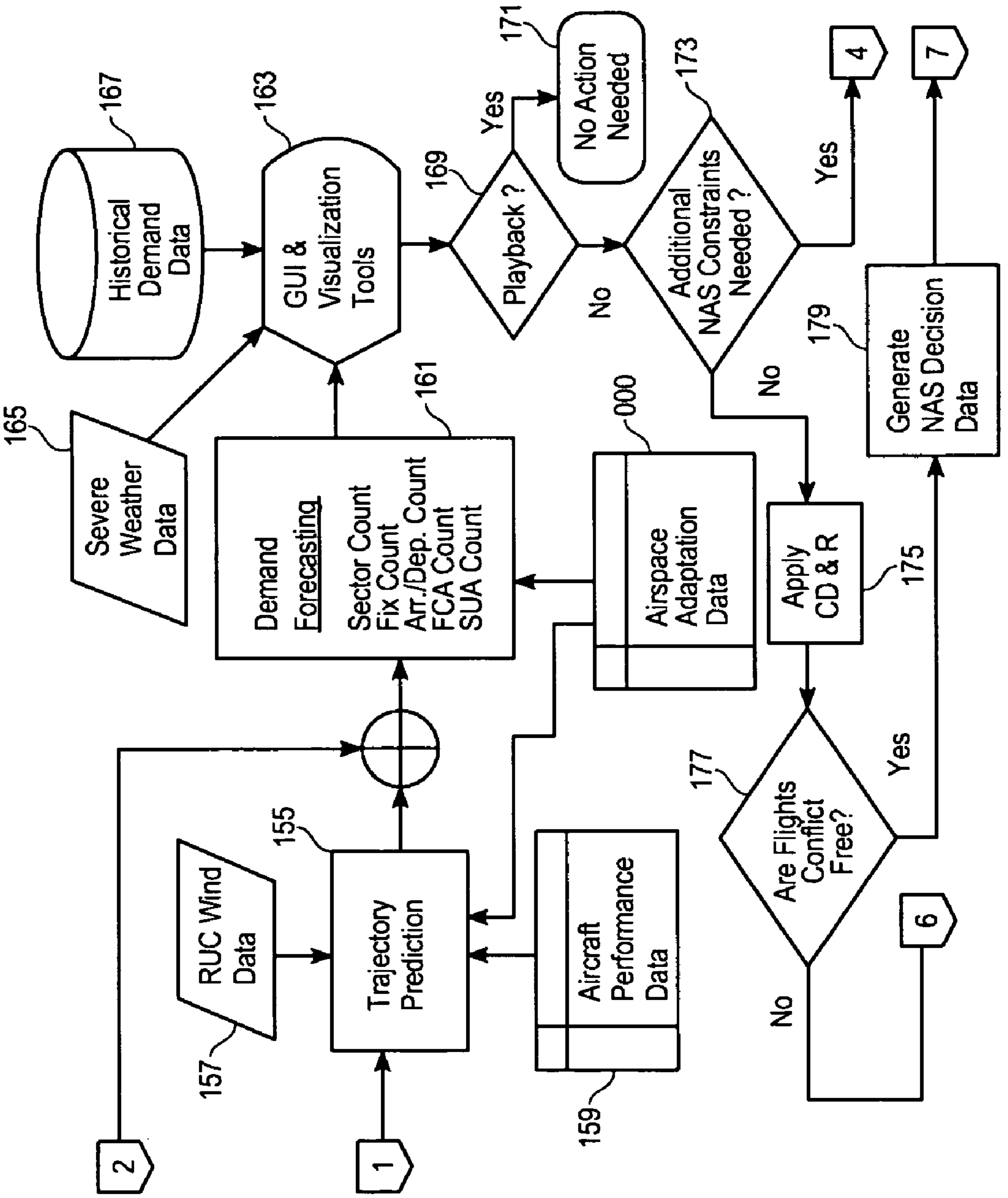

FIGS. 14*a*, 14*b*, 14*c* and 14*d* illustrate a procedure for flow of information according to an embodiment of the invention. FIGS. 14*a* and 14*b* describe the flow of information from air traffic service provider's decision-making, and FIGS. 14*c* and 14*d* describe the flow of information from air traffic service user's decision making. The system first determines, in step 141, for a given flight or given group of flights, whether the flight(s) is active and has a current track and a flight plan or is based upon a proposed flight plan, which is expected to become active at a future time. These data consisting of tracks, active flight plans and proposed flight plans are recorded, in step 143, and stored in the recorded flight database (RFDB), in step 145, for use at a later date. Real-time data from step 141 or historical data from the RFDB are used for further processing. The user selects (i) live mode or (ii) simulation mode or (iii) playback mode for the flight(s), as defined in step 147. In step 149, the system determines if the user has selected playback mode. Because only recorded data can be played back, the playback mode uses data from RFDB.

If the answer to the query in step 149 is "no," in step 151 the system moves along path 1 and determines, in step 151, if this flight(s) is impacted by NAS constraints including one or more of the following constraints: playbook routes; GS/GDP constraints; MIT constraints; local re-routing constraints; (re) sectorization constraints; and departure restrictions. In step 152, the system allows modification of one or more NAS constraints provided in step 151. The system also moves along path 5 and provides real-time flight data from step 141 or recorded flight data from RFDB (step 145) to step 182 to enable decision-making from air traffic service user's perspective (discussed in the following).

Figure 14C:
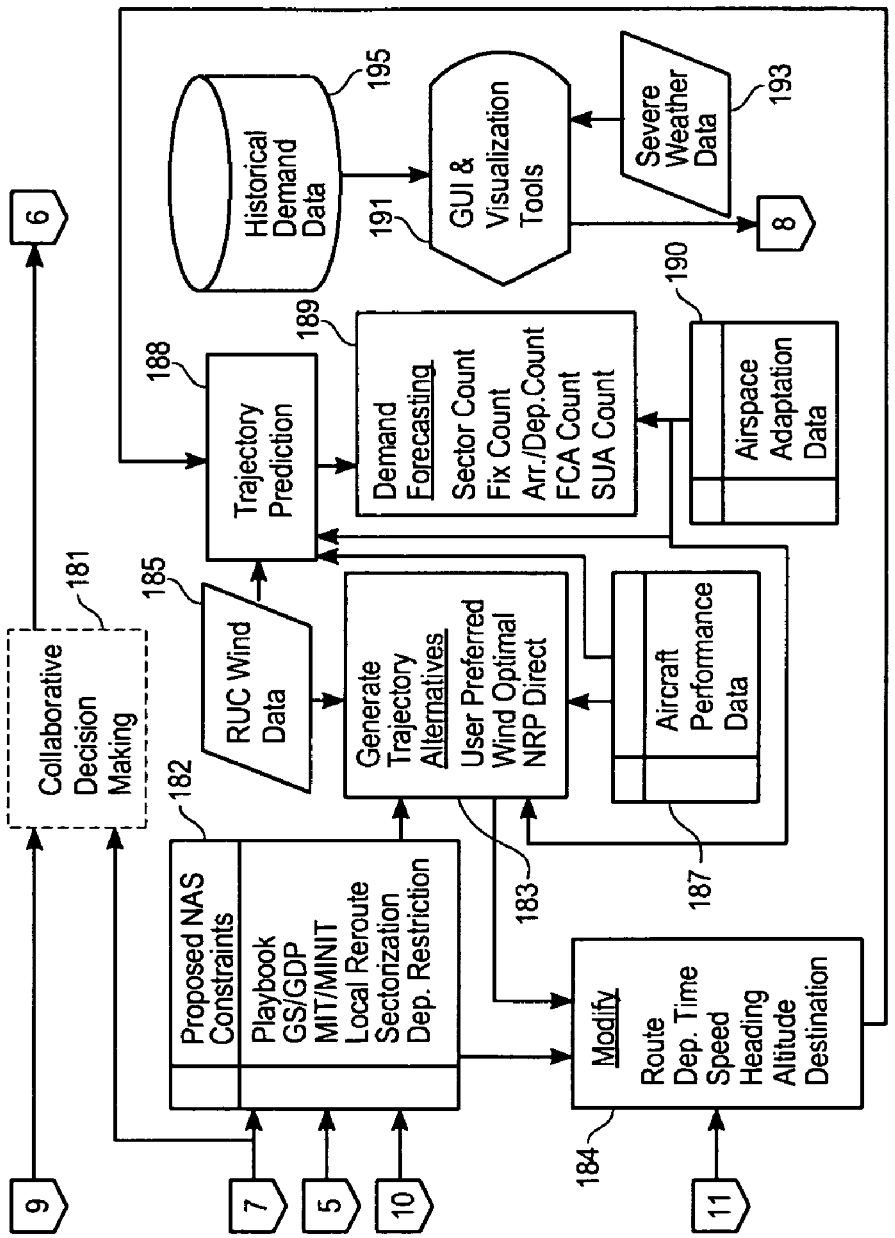
Figure 14D:
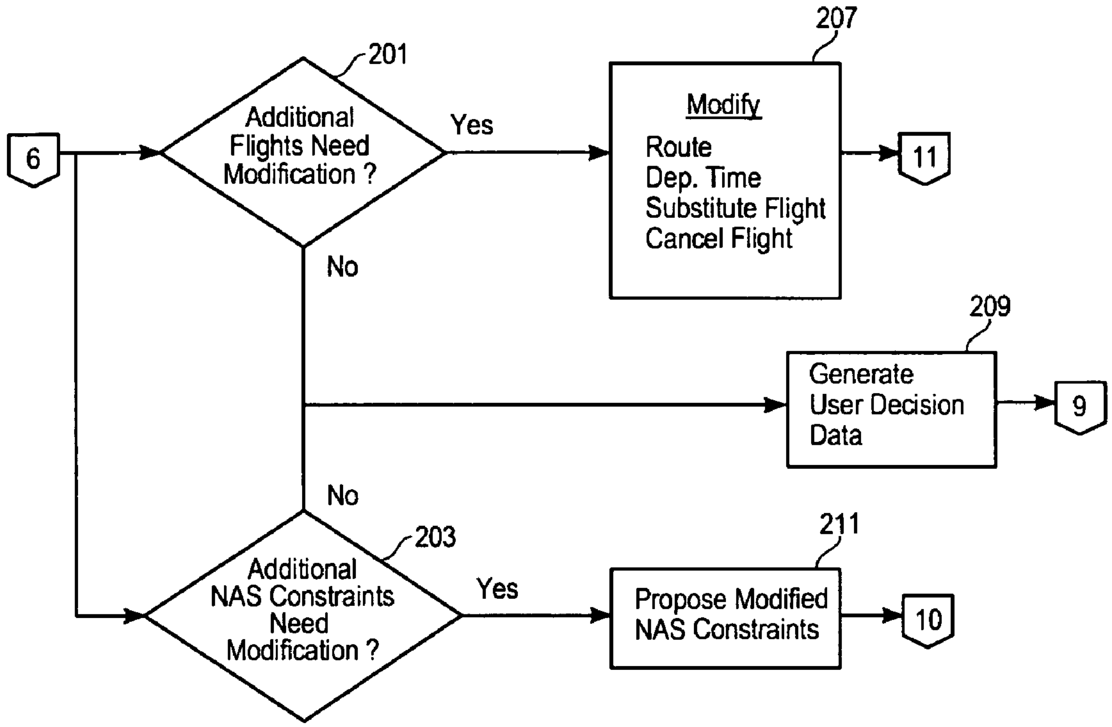

One or more defining flight parameters (flight route; departure time; flight altitude; flight speed; flight heading; and destination airport) are modified in step 153 to comply with the NAS constraints in step 151. These defining flight parameters are also altered via path 6, as discussed in the following, based on the outcome of collaborative decision-making between the air traffic service provider and the air traffic service user in step 181 (FIG. 14*c*). The system then moves via path 1 to step 155 to predict flight trajectories (locations at future times) of both active aircraft and proposed aircraft, using flight parameters from step 153, rapid update cycle (RUC) wind velocity forecast data (step 157) and information from an aircraft performance database (step 159) containing nominal performance data for different types of aircraft. The system uses the predicted trajectories to forecast the demand for airspace and airport resources, in step 161, where one or more of the following quantitative measures of flight activity are estimated: traffic count in one or more selected sectors (sector count); traffic count over one or more fixes (fix count); arrival counts at selected airports; departure counts at a selected airports; FCA traffic counts; and/or special use airspace traffic counts for selected SUAs. Step 161 relies on geometric information from an airspace adaptation database, provided in step 162.

If the answer to the query in step 149 is "yes" so that playback mode is desired, the system obtains relevant trajectory information directly from the RFDB (step 145) and follows path 2, circumventing the trajectory prediction step in 155, to forecast demand (step 161).

Irrespective of the answer to the query in step 149, the system then moves to step 163, where a graphical user interface (GUI) and visualization tools module provide relevant, visually perceptible illustrations of aircraft location, flight route, severe weather data (step 165), computed demand estimates (step 161) and demand estimates from an historical database (step 167). The system then determines, in step 169, if a playback mode was requested earlier in step 149. If the answer to the query in step 149 is "yes," playback is provided, based on the presently assembled information, and no further action is required (step 171).

If the answer to the query in step 169 is "no" so that a live mode or simulation mode is specified, the system moves to step 173 and determines if additional NAS constraints are needed for mitigating imbalances between demand for, and the available capacities of, the airspace and airport resources, in order to manage air traffic. If the answer to the query in step 173 is "no," the system applies a conflict detection and resolution (CD&R) analysis and response to the active and proposed flights, in step 175, and determines, in step 177, whether the flights are conflict-free after application of the CD&R analysis and response.

If the answer to the query in step 173 is "yes," the system follows path 4 and determines one or more of the NAS constraints that need modification (step 152), changes the NAS constraints accordingly in step 151, determines which flights are impacted by these new NAS constraints in step 151, changes one or more of the selected route parameters to comply with the new constraints (step 153), and continues along path 1 as before.

If the answer to the query in step 177 is "no," the system moves along path 3 to step 153 and modifies at least one of the following flight parameters: flight route; departure time; flight speed; altitude; flight heading; and destination airport. After step 153, the system again proceeds along path 1.

If the answer to the query in step 177 is "yes," the system follows path 7 and generates NAS decision data from the service provider's perspective (optionally including a new set of NAS constraints and flight parameter changes), in step 179. The system continues along path 7 to step 181, where collaborative decision-making between the air traffic service provider and the air traffic service user occurs. The system proceeds along path 6 to steps 152 and 153, depending upon the results of collaborative decision-making and proceeds again along path 1.

Service providers such as the Federal Aviation Administration (FAA) in the United States would typically perform the procedures in steps 141 through 179 in FIGS. 14*a*-14*b*. The users of air traffic services are typically commercial aviation, business aviation, general aviation, military and individual pilots. Both air traffic service providers and air traffic service users (collectively referred to as "users" herein) can use the system.

Along path 7, the system proceeds to step 181, collaborative decision making and, in parallel, to step 182, where it is determined if the air traffic service user's flights are impacted by NAS constraints. Step 182 uses real-time data from step 141 or historical data from step 145, received via path 5. Desired modifications to NAS constraints in step 211 (FIG. 14*d*) are also received in step 182 via path 10. Step 182 is substantially similar to step 151.

One or more trajectory alternatives are generated in step 183, including wind optimal routes and NPR routes and user-preferred routes to mitigate the impact of NAS constraints on user's flights. The alternative trajectory generation step 183 utilizes RUC wind data (step 185) and aircraft performance data (step 187) that is generic (as in step 159) or is specific to user's particular fleet of aircraft.

Flight parameters including flight route; departure time; flight altitude; flight speed; flight heading; and destination airport are modified in step 184 to comply with the proposed NAS constraints provided in step 182 and to realize the alternative trajectories generated via step 183. Trajectories of both active and proposed aircraft are predicted in step 188 using the flight parameters specified in step 184, RUC wind velocity forecast (step 185) and aircraft performance data (step 187).

The collaborative decision making step often involves negotiation between the service provider and the service user concerning modification of NAS constraints (step 152) and the resulting defining flight parameters (step 153). If, as a result of such negotiation, one or more NAS constraints and/or one or more defining flight parameters are changed, the procedures of steps 151 through 179 are repeated.

From step 188, the system moves to step 189, demand forecasting using aircraft adaptation data (step 190), where one or more of the following quantitative measures of flight activity are estimated: traffic count in one or more selected sectors (sector count); traffic count over one or more fixes (fix count); arrival counts at selected airports; departure counts at a selected airports; FCA traffic counts; and/or special use airspace traffic counts for selected SUAs. The procedures in steps 161 and 189 are substantially identical The system then moves to step 191, where a graphical user interface and visualization tools module provides relevant, visually perceptible illustrations of aircraft location, flight route, severe weather data from step 193, computed demand estimates from step 189 and/or historical airspace demand data from database in step 195. The procedures in steps 163 and step 191 may be substantially the same, or step 191 may include additional illustrations especially tailored from the airspace service user's perspective.

The system then moves along path 8 in the following manner: (1) to step 201 and determines if one or more flights need additional modification; and (in parallel) (2) to step 203 and determines if one or more of the NAS constraints need additional modification. If the answer to the query in step 201 is "no" so that no additional modifications are needed), the system generates user decision data, in step 209, which may include proposals for changes in defining flight parameters (step 181). If the answer to the query in step 201 is "yes," the system implements one or more of the following actions, in step 207: modify flight route; modify flight departure time; cancel a flight; and provide a substitute flight in lieu of the cancelled flight. These changes are provided to step 184 via path 11 for reassessment via modules 184, 188, 189 and 191.

If the answer to the query in step 203 is "no," the system moves to step 209 to generate and present user decision data, which may include proposals for changes in NAS constraints (step 181). If the answer to the query in step 203 is "yes," the system proposes modifications in one or more NAS constraints, in step 211, and provides these data to module 182 via path 10. The impact of the proposed modifications to the NAS constraints can be reexamined via modules 182, 183, 184, 188, 189 and 191 along with the supporting data modules 185, 187, 190, 193 and 195. Once the desired set of proposed NAS constraints and flight parameters is obtained by repeated reevaluation via paths 11 and 10, the system then moves to step 209, then to step 181, where both the service provider and the service user, or several users, collectively agree on the choice of NAS constraints and flight parameters. These agreed upon choices are then realized in steps 152 and 153. The procedures illustrated in FIGS. 14*a*-14*d* are applied to one or more aircraft flights and to the corresponding aircraft.

The overall system-procedure, illustrated in one embodiment in FIG. 14, may use information and features from the graphical user interface (GUI), the weather and winds data module, the weather/winds interpolation module, the filed flight plans module, the aircraft performance database, the air traffic monitoring module, the route parser and/or trajectory predictor module, the traffic analyzer module, the miles-in-trail and/or minutes-in trail restriction module, the conflict detection and resolution (CD&R) module, the direct-to module, the playback and CD&R evaluation module, and/or the system-wide optimization module, as discussed in the preceding Sections, A, B, C, D, E, F, G, H, I, J, K, L, M and N.

TABLE 1

Aircraft Performance Data.

CC B757___ PERFORMANCE FILE Oct. 1, 1998
CC
CC AC/Type: B757___ DADS Revision: 1.1
CC
CC Units:
CC Speeds: CAS Mach Mass (kg) Temperature: ISA
CC
cas__climb = 290;
mach__climb = 0.78;
CC
cas__cruise = 320;
mach__cruise = 0.80;
CC
cas__descent = 300;
mach__descent = 0.78;
CC
mass__low = 69600;
mass__fain = 95000;
mass__high = 110000;
CC
max__alt = 42000;
CC
cruise__alt = 37000;
cruise__alt__east = 37000;
cruise__alt__west = 35000;
CC
CC cruise data = [FL; TAS (knots); fuel low(kg/min); nom(kg/min); high(kg/min)]

TABLE 1-continued

Aircraft Performance Data.

| FL | TAS | fuel consump. (low) | (med) | (high) |
|---|---|---|---|---|
| 30 | 261 | 40.8 | 51.2 | 58.9 |
| 40 | 265 | 40.9 | 51.4 | 59.1 |
| 60 | 272 | 41.1 | 51.7 | 59.5 |
| 80 | 280 | 41.3 | 52.0 | 59.8 |
| 100 | 289 | 41.5 | 52.3 | 60.2 |
| 120 | 379 | 58.3 | 65.5 | 70.7 |
| 140 | 390 | 58.5 | 65.8 | 71.1 |
| 160 | 401 | 58.7 | 66.1 | 71.5 |
| 180 | 413 | 58.9 | 66.4 | 71.9 |
| 200 | 425 | 59.0 | E6.7 | 72.3 |
| 220 | 438 | 59.2 | 66.9 | 72.7 |
| 24 | 451 | 59.3 | 67.2 | 73.1 |
| 260 | 465 | 59.4 | 67.5 | 73.5 |
| 280 | 475 | 58.7 | 67.0 | 73.2 |
| 300 | 471 | 55.2 | 64.3 | 71.1 |
| 320 | 467 | 52.2 | 62.1 | 69.5 |
| 340 | 463 | 49.5 | 60.5 | 68.5 |
| 360 | 459 | 47.3 | 59.3 | 68.1 |
| 380 | 458 | 45.7 | 58.9 | 68.6 |
| 400 | 458 | 44.5 | 58.9 | 69.6 |
| 420 | 458 | 43.3 | 58.9 | 70.6 |
| CC | | | | |

CC climb__data = [FL; TAS(knots); ROCD low(fpm); nom(fpm); high(fpm); fuel nom(kg/min)]

| FLSR | TAS | ROCD(low) | (med) | (high) | fuel consump. (med) |
|---|---|---|---|---|---|
| 0 | 169 | 3760 | 2320 | 1730 | 170.4 |
| 5 | 170 | 3740 | 2300 | 1710 | 169.1 |
| 10 | 171 | 3720 | 2280 | 1690 | 167.7 |
| 15 | 172 | 3700 | 2270 | 1670 | 166.3 |
| 20 | 174 | 3680 | 2250 | 1660 | 164.9 |
| 30 | 261 | 5120 | 3460 | 2800 | 173.9 |
| 40 | 265 | 5060 | 3410 | 2750 | 171.1 |
| 60 | 272 | 4910 | 3290 | 2650 | 165.5 |
| 80 | 280 | 4770 | 3180 | 2540 | 159.9 |
| 100 | 289 | 4610 | 3050 | 2430 | 154.4 |
| 120 | 344 | 4670 | 3150 | 2540 | 154.2 |
| 140 | 354 | 4470 | 2990 | 2400 | 148.6 |
| 160 | 365 | 4260 | 2820 | 2250 | 143.0 |
| 180 | 376 | 4030 | 2650 | 2100 | 137.4 |
| 200 | 387 | 3800 | 2480 | 1940 | 131.7 |
| 220 | 399 | 3570 | 2300 | 1780 | 126.1 |
| 240 | 412 | 3320 | 2110 | 1610 | 120.5 |
| 260 | 425 | 3070 | 1910 | 1440 | 114.8 |
| 280 | 438 | 2810 | 1710 | 1260 | 109.1 |
| 300 | 452 | 2540 | 1510 | 1080 | 103.4 |
| 320 | 455 | 3210 | 1830 | 1240 | 97.0 |
| 340 | 451 | 2880 | 1540 | 970 | 90.1 |
| 368 | 447 | 2540 | 1230 | 670 | 83.4 |
| 380 | 447 | 2010 | 850 | 330 | 76.9 |
| 400 | 447 | 1680 | 540 | 30 | 70.5 |
| 420 | 447 | 1350 | 230 | 0 | 64.1 |

CC descent__data = [Fl; TAS (knots); ROCD(fpm); fuel (kg/min)]

| FLSK | TAS | ROCD | fuel consumed |
|---|---|---|---|
| 0 | 132 | 1340 | 19.0 |
| 5 | 133 | 1350 | 18.8 |
| 10 | 134 | 1360 | 18.7 |
| 15 | 151 | 1280 | 18.5 |
| 20 | 193 | 1210 | 18.3 |
| 30 | 217 | 1250 | 18.0 |
| 40 | 241 | 1340 | 17.7 |
| 60 | 272 | 1490 | 17.0 |
| 80 | 280 | 1520 | 16.2 |
| 100 | 289 | 1560 | 15.7 |
| 120 | 356 | 2020 | 15.0 |
| 140 | 366 | 2060 | 14.3 |
| 160 | 377 | 2090 | 13.7 |
| 180 | 388 | 2120 | 13.0 |
| 20.0 | 400 | 2160 | 12.3 |

TABLE 1-continued

| Aircraft Performance Data. | | | |
|---|---|---|---|
| 220 | 412 | 2190 | 11.7 |
| 240 | 425 | 2220 | 11.0 |
| 260 | 438 | 2260 | 10.3 |
| 290 | 452 | 1690 | 16.5 |
| 300 | 459 | 2320 | 16.9 |
| 320 | 455 | 2270 | 15.7 |
| 340 | 451 | 2240 | 14.6 |
| 360 | 447 | 2240 | 13.5 |
| 380 | 447 | 2100 | 12.5 |
| 400 | 447 | 2160 | 11.4 |
| 420 | 447 | 2220 | 10.3 |

TABLE 2

| # | Route Code | Origin | Destination | Departure Fix | Route String | Departure ARTCC | Arrival ARTCC | Traverted ARTCCs |
|---|---|---|---|---|---|---|---|---|
| 1 | JFKORD60 | KJFK | KORD | RBV | KJFK<br>RBV<br>ETX<br>J60<br>GSH<br>OXI<br>OXI3<br>KORD | ZNY | ZAU | ZAU<br>ZNY<br>ZOB |
| 2 | JFKORD61 | KJFK | KORD | RBV | KJFK<br>RBV<br>ETX<br>J60<br>PSB<br>DKK<br>J36<br>FNT<br>PMM4<br>KORD | ZNY | ZAU | ZAU<br>ZNY<br>ZOB |
| 3 | JFKORD64 | KJFK | KORD | RBV | KJFK<br>RBV<br>J64<br>FWA<br>OX13<br>KORD | ZNY | ZAU | ZAU<br>ZNY<br>ZOB |
| 4 | JFKORD80 | KJFK | KORD | RBV | KJFK<br>RBV<br>J230<br>AIR J80<br>EMPTY<br>J149<br>FWA<br>OXI3<br>KORD | ZNY | ZAU | ZAU<br>ZNY<br>ZOB |
| 5 | JFKORD95 | KJFK | KORD | GAYEL | KJFK<br>GAYEL<br>J95<br>CFB<br>DKK<br>FNT<br>PMM4<br>KORD | ZNY | ZAU | ZAU<br>ZNY<br>ZOB |
| 6 | JFKORDCA | KJFK | KORD | GREKI | V419<br>JUDDS<br>CAM<br>J547<br>BUF<br>J94<br>FNT<br>PMM4<br>KORD | ZNY | ZAU | CZY<br>ZAU<br>ZBW<br>ZNY<br>ZOB |
| 7 | JFKORDDJ | KJFK | KORD | RBV | KJFK<br>RBV<br>ETX<br>J60 DJB<br>FNT<br>PMM<br>PMM4<br>KORD | ZNY | ZAU | ZAU<br>ZNY<br>ZOB |
| 8 | JFKORDJ6 | KJFK | KORD | RBV | KJFK<br>RBV<br>J230<br>SAAME | ZNY | ZAU | ZAU<br>ZNY<br>ZOB |

TABLE 2-continued

| # | Route Code | Origin | Destination | Departure Fix | Route String | Departure ARTCC | Arrival ARTCC | Traverted ARTCCs |
|---|---|---|---|---|---|---|---|---|
| | | | | | J6 COLNS J134 FLM J24 VHP OKK OKK1 KORD | | | |
| 9 | JFKORDJV | KJFK | KORD | GREKI | KJFK GREKI V419 JUDDS CAM ART YCF YEE ASP TVC GRB MSN JVL JVL4 KORD | ZNY | ZAU | CZY ZAU ZBW ZMP ZNY |
| 10 | JFKORDP5 | KJFK | KORD | RBV | KJFK RBV J230 AIR J80 CAP PNT V227 PLANO KORD | ZNY | ZAU | ZAU ZID ZKC ZNY ZOB |
| 11 | JFKORDPH | KJFK | KORD | COATE | KJFK COATE J36 FNT PMM4 KORD | ZNY | ZAU | ZAU ZNY ZOB |
| 12 | JFKORDRF | KJFK | KORD | WAVEY | KJFK WAVEY EMJAY J174 ORF PSK IIU VHP OKK OKK1 KORD | ZNY | ZAU | ZAU ZBW ZDC ZID ZNY ZTL |
| 13 | JKFORDX6 | KJFK | KORD | RBV | KJFK RBV J230 SAMME J6 EYTEE J149 FWA DXI3 KORD | ZNY | ZAU | ZAU ZDC ZID ZNY |
| 14 | JFKORDXU | KJFK | KORD | GREKI | KJFK GREKI V419 JUDDS CAM J547 SYR J63 EHMAN YXU J547 PMM PMM4 KORD | ZNY | ZAU | CZY ZAU ZBW ZNY ZOB |

What is claimed is:

1. A method for estimating a minimum distance of approach of two aircraft that are airborne, the method comprising:

providing information on an initial location vector r0(t=t1; n), on an initial velocity vector r1(t=t1;n) and on an initial acceleration vector r2(t=t1;n) at a selected time t=t1, for each of N aircraft, numbered n=1, . . . , N (N≧2) that are airborne;

approximating said location vector r(t;n) for aircrafts number n=n1 and n=n2 (n1≠n2) over a selected time interval [t1,t2] by quadratic vector functions of time, $$r(t;n1;\mathrm{app})=r0(n1)+r1(n1)\cdot(t-t1)+r2(n1)\cdot(t-t1)^2,$$

$$r(t;n2;\mathrm{app})=r0(n2)+r1(n2)\cdot(t-t1)+r2(n2)\cdot(t-t1)^2,$$

$$\Delta r(t;\mathrm{app})=r(t;n1;\mathrm{app})-r(t;n2;\mathrm{app})=\Delta r0+\Delta r1(t-t1)+\Delta r2(t-t1)^2,$$

respectively, where t1 is a selected time within a selected time interval [T1,T2], each of the location vectors r(t;n1;app) and r(t;n2;app) substantially describes motion on a great circle in a plane, and the vector coefficients r0;n1), r1(n1), r2(n1), r0(n2), r1(n2) and r2(n2) are chosen to optimally match the vector functions r(t;n1;app) and r(t;n2;app) in the selected time interval [T1,T2]; and estimating a minimum distance of approach d(min) for a magnitude |r(t;n1)−r(t;n2)| of a vector difference, by identifying at least one real time t(min) for which a time derivative of the quantity $|r(t;n1)-r(t;n2)|^2$ is zero, $$2\Delta r0\Delta r1+\{\Delta r1\cdot\Delta r1+2\Delta r0\cdot\Delta r2)(t-t1)+6\Delta r1\cdot\Delta r2(t-t1)^2+4\Delta r2\cdot\Delta r2(t-t1)^3=0,$$

and by interpreting the vector magnitude |r(t=t(min);n1)−r(t=t(min);n2)| as the minimum distance d(min).

2. A method for managing aircraft traffic, the method comprising:

providing information on location vector $r_n$(t=tm) and velocity vector $v_n$(t=tm) for each of N aircraft, numbered n=1, . . . , N (N≧2) that are airborne and are located within a selected air route traffic control center (ARTCC), for at least one selected time t=tm, where each of the N aircraft is assigned to at least one ARTCC sector, numbered s=1, . . . , S (S≧2) in the selected ARTCC;

at a time, t=tm'>tm, altering at least one boundary of each of at least two selected adjacent ARTCC sectors, numbered s=s1 and s=s2 (s1≠s2), within the selected ARTCC to provide altered sectors, numbered s=s1' and s=s2', respectively, where the union of the at least two selected adjacent sectors encloses the union of the at least two altered sectors; and providing information on location vector $r_n$(t=tm') and velocity vector $v_n$(t=tm') for each of the N aircraft, that is airborne and is located within the selected ARTCC, for the time t=tm', where each of the N aircraft is assigned to at least one ARTCC sector, numbered s=1, . . . , S (S≧2) in the selected ARTCC.

3. A method for managing aircraft traffic, the method comprising:

providing information on an initial location vector $r_{0n}$ (t=t0) and an initial velocity vector $v_{0n}$(t=t0) for each of N aircraft, numbered n=1, . . . , N (N≧2) that are airborne;

approximating the location vector r(t;n) for the aircraft number n=n1 and for the aircraft n=n2 (n1≠n2; n1, n2≦N) by vector functions that are at least quadratic in a time variable t, $$r(t;n1;\mathrm{app})=r0(t;n1)+r1(t;n1)\cdot(t-t0)+r2(t;n1)(t-t0)^2,$$

$$r(t;n2;\mathrm{app})=r0(t;n2)+r1(t;n2)\cdot(t-t0)+r2(t;n2)(t-t0)^2,$$

respectively, relative to a selected initial time t0, where each of the location vectors r(t;n1) and r(t;n2) substantially describes motion on a great circle in a plane, and the vector coefficients r0(t;n1), r1(t;n1), r2(t;n1), r0(t;n2), r1(t;n2) and r2(t;n2) are chosen to optimally match the vector functions r(t;n1) and r(t;n2) in a selected time interval [t1,t2]; and determining a descent-start location at which the aircraft should begin its descent toward a destination airport along a substantially linear descent path, where an altitude descent rate experienced by the aircraft is a selected fraction f (0<f≦1) of a maximum altitude descent rate.

4. A method for managing aircraft traffic, the method comprising:

providing information on an initial location vector $r_{0n}$ (t=t0) and an initial velocity vector $v_{0n}$(t=t0) for each of N aircraft, numbered n=1, . . . , N (N≧2) that are airborne;

approximating the location vector r(t;n) for the aircraft number n=n1 and for the aircraft n=n2 (n1≠n2; n1, n2≦N by vector functions that are quadratic in a time variable t, $$r(t;n1;\mathrm{app})=r0(t;n1)+r1(t;n1)\cdot(t-t0)+r2(t;n1)\cdot(t-t0)^2,$$

$$r(t;n2;\mathrm{app})=r0(t;n2)+r1(t;n2)\cdot(t-t0)+r2(t;n2)(t-t0)^2,$$

respectively, relative to a selected initial time t0, where each of the location vectors r(t;n1) and r(t;n2) substantially describes motion on a great circle in a plane, and the vector coefficients r0(t;n1), r1(t;n1), r2(t;n1), r0(t;n2), r1(t;n2) and r2(t;n2) are chosen to optimally match the vector functions r(t;n1) and r(t;n2) in a selected time interval [t1,t2];

providing an estimate of a wind velocity vector $v_w=(v_w\cos\theta_w, v_w\sin\theta_w)$ at a specified location, where $v_w$ is an estimated magnitude of the wind velocity vector and $\theta_w$ is an angle of the wind velocity vector measured relative to a selected reference line or reference plane;

providing an estimate of a desired angle $\theta_{des}$ of travel of said aircraft in an environment including the estimated wind velocity vector; and orienting a velocity vector associated with said aircraft at an angle $\theta_{comp}$ relative to the reference line or plane, where $\theta_{comp}$ is determined by $$\tan\theta_{comp}=\{v_{des}\sin\theta_{des}-v_w\sin\theta_w\}/\{v_{des}\cos\theta_{des}-v_w\,\mathrm{s}\cos\theta_w\}.$$

5. A method for managing aircraft traffic, the method comprising:

providing information on an initial location vector $r_{0n}$ (t=t0) and an initial velocity vector $v_{0n}$(t=t0) for each of N aircraft, numbered n=1, . . . , N (N≧2) that are airborne;

approximating the location vector r(t;n) for the aircraft number n=n1 and for the aircraft n=n2 (n1≠n2; n1, n2≦N) by vector functions that are quadratic in a time variable t, $$r(t;n1;\mathrm{app})=r0(t;n1)+r1(t;n1)\cdot(t-t0)+r2(t;n1)\cdot(t-t0)^2,$$

$$r(t;n2;\mathrm{app})=r0(t;n2)+r1(t;n2)\cdot(t-t0)+r2(t;n2)(t-t0)^2,$$

respectively, relative to a selected initial time t0, where each of the location vectors r(t;n1) and r(t;n2) substantially describes motion on a great circle in a plane, and the vector coefficients r0(t;n1), r1(t;n1), r2(t;n1), r0(t;n2), r1(t;n2) and r2(t;n2) are chosen to optimally match the vector functions r(t;n1) and r(t;n2) in a selected time interval [t1,t2];

providing an estimate of a wind velocity vector $v_w=(v_w\cos\theta_w, v_w\sin\theta_w)$ at a specified location, where $v_w$ is an estimated magnitude of the wind velocity vector and $\theta_w$ is an angle of the wind velocity vector measured relative to a selected reference line or reference plane;

providing an estimate of a desired angle $\theta_{des}$ of travel and a desired magnitude of velocity of travel $v_{des}$ of said aircraft;

providing an estimate of a desired magnitude of velocity of travel $v_{des}$ in an environment including the estimated wind velocity vector; and providing said aircraft with an associated magnitude of aircraft velocity $v_{comp}$, in the absence of said wind velocity vector, that is given by $$v_{comp}=\{v_{des}^2+v_w^2-2v_{des\ vw}\cos(\theta_{des}-\theta_w)\}^{1/2}.$$

6. A method for managing aircraft traffic, the method comprising:

receiving and storing in a database an estimated location vector for a sequence of times over a time interval that includes at least at two flight days; and using information in the database to estimate a number of flights in a selected region, including at least one identified ARTCC sector, for at least one prediction time that is not included in the at least two flight days;

estimating a number of aircraft that will be located in the selected region at each of a second selected sequence of times; and when the at least one identified ARTCC sector will contain more than a selected threshold number of the aircraft at an identified time among the second sequence of times, changing at least one boundary between the at least one identified ARTCC sector and an adjacent ARTCC sector to reduce the number of aircraft contained in the at least one identified ARTCC sector at a time preceding the identified time; and displaying a selected area including the selected region, after the at least one boundary is changed, in a visually distinguishable format, when the selected region will contain no more than the selected threshold number of the aircraft at the identified time.

7. A method for managing aircraft traffic, the method comprising:

receiving and storing in a database an estimated location vector and estimated velocity vector for each of N aircraft (N≧2) at each of a selected sequence of times over a time interval that includes at least at two flight days;

using information in the database to estimate a number of flights within an identified ARTCC sector, including a selected airport at which the N aircraft are expected to land, for at least one prediction time that is not included in the at least two flight days;

estimating a number of the N aircraft that will descend and land at the selected airport within each of a selected sequence of time intervals; and estimating a demand on at least one of (i) at least one runway at the selected airport and (ii) a selected group of arrival-departure gates at the selected airport.

8. A method for managing aircraft traffic, the method comprising:

receiving and storing in a database an estimated location vector and estimated velocity vector for each of N aircraft (N≧2) at each of a selected sequence of times over a time interval that includes at least at two flight days;

using information in the database to estimate a number of flights within an identified ARTCC sector, including a selected airport at which the N aircraft are initially located, for at least one prediction time that is not included in the at least two flight days;

estimating a number of the N aircraft that will take off and ascend from the selected airport within each of a selected sequence of time intervals;

estimating a demand on at least one of (i) at least one runway at the selected airport and (ii) a selected group of arrival-departure gates at the selected airport;

providing information on an initial location vector $r_{0n}$ (t=t0) and an initial velocity vector $v_{0n}$(t=t0) for each of N aircraft, numbered n=1, . . . , N (N≧2) that are airborne;

aircraft at a time t(est) that is displaced from an initial time t0 by approximate time increments Δtm, numbered m=1, . . . , M (M≧2), where 0<Δt1<Δt2≦ . . . <ΔtM; and where the magnitude $|r_{01}-r_{02}|$ of the difference of the location vectors of aircrafts number n=1 and n=2 is estimated to be less than a selected difference value for at least one of the time increments Atm, assigning a conflict avoidance response to at least one of the aircrafts number n=1 and n=2 so that, with the conflict avoidance response implemented, the magnitude of the difference of the location vectors of aircrafts number n=1 and n=2 for each of the time increments Δtm is no less than the selected difference value.

9. A method for estimating a minimum distance of approach of two aircraft that are airborne, the method comprising:

providing information on an initial location vector r0(n)=r (t=t1;n) and an initial velocity vector v0(n)=v(t=t1;n) for each of N aircraft, numbered n=1, . . . , N (N≧2) that are airborne;

estimating a location separation vector Δr(t;n) for each of at least two aircraft, number n=n1 and n=n2 (n1≠n2), as Δr(t;n)=r0(n)+v0(n)(t−t1) for a selected reference time t1;

estimating a time at which a minimum distance of separation occurs for the aircraft, n=n1 and n=n2, to be about $\Delta t(\min)=t1-(\Delta r_{1,2}\cdot\Delta v_{,2)/})/(\Delta v_{1,2})^2$, where $\Delta r_{1,2}$=r0(n1)−r0(n2) and $\Delta v_{1,2}$=v0(n1)−v0(n2); and estimating a minimum distance of separation to be about $|\Delta r(\min)|=\{\Delta r_{1,2}{}^2\Delta v_{1,2}{}^2-\Delta r_{1,2}\cdot\Delta v_{1,2})\}/(\Delta v_{1,2})^2$.

10. The method of claim 1, further comprising:

when said minimum distance of approach is less than a selected threshold number for a value of said time t=t (min) within said selected time interval [t1,t2], advising at least one of said aircraft number n1 and number n2 interpreting this condition as indicating that an aircraft conflict is likely to occur between said aircrafts n=n1 and n=n2 within said selected time interval; and when an aircraft conflict is determined to be likely to occur, allowing at least one of said aircraft number n=n1 and n=n2 to adopt a conflict avoidance response from a group of avoidance responses comprising: (1) changing a heading angle for said at least one of said aircrafts number n=1 and n=2; (2) changing a velocity vector for said at least one of said aircrafts number n=1 and n=2; (3) changing a magnitude of at least one of said initial velocity vectors $v_{01}$ and $v_{02}$; (4) changing an altitude of flight for said at least one of said aircrafts number n=1 and n=2; and (5) changing at least one of an aircraft ascent rate and an aircraft descent rate for at least one of said aircrafts number n=1 and n=2.

11. The method of claim 1, further comprising providing a desired route for at least one aircraft that is substantially at least one of a wind-optimal route and an NPR route.

12. The method of claim 1, further comprising choosing said selected difference value to lie in a range of 3-5 nautical miles in a horizontal direction and 1000-2000 feet in a vertical direction.

* * * * *